United States Patent
Kai et al.

(10) Patent No.: US 8,570,173 B2
(45) Date of Patent: Oct. 29, 2013

(54) RADIO FREQUENCY TAG AND METHOD OF MANUFACTURING THE SAME

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 914 days.

(21) Appl. No.: 12/687,581

(22) Filed: Jan. 14, 2010

(65) Prior Publication Data

US 2010/0117833 A1 May 13, 2010

Related U.S. Application Data

(63) Continuation of application No. PCT/JP2008/063408, filed on Jul. 25, 2008.

(30) Foreign Application Priority Data

Jul. 25, 2007 (WO) .................. PCT/JP2007/064548

(51) Int. Cl.
G08B 13/14 (2006.01)
(52) U.S. Cl.
USPC .................................... 340/572.1; 340/572.7
(58) Field of Classification Search
USPC ........ 340/572.1, 572.7, 10.1, 13.25; 235/492; 257/678; 343/845
See application file for complete search history.

(56) References Cited

U.S. PATENT DOCUMENTS

| | | | |
|---|---|---|---|
| 6,018,299 A * | 1/2000 | Eberhardt | 340/572.7 |
| 6,100,804 A * | 8/2000 | Brady et al. | 340/572.7 |
| 6,281,848 B1 * | 8/2001 | Nagumo et al. | 343/702 |
| 6,339,385 B1 * | 1/2002 | Tuttle | 340/13.25 |
| 6,758,405 B2 | 7/2004 | Look | |
| 6,891,466 B2 | 5/2005 | Turner et al. | |
| 7,248,221 B2 | 7/2007 | Kai et al. | |
| 7,503,505 B2 | 3/2009 | Koyama et al. | |
| 7,570,225 B2 | 8/2009 | Kai et al. | |
| 7,916,032 B2 | 3/2011 | Baba et al. | |
| 2002/0014993 A1 | 2/2002 | Turner et al. | |
| 2003/0111542 A1 | 6/2003 | Look | |
| 2006/0012527 A1 | 1/2006 | Kai et al. | |

(Continued)

FOREIGN PATENT DOCUMENTS

| EP | 1538560 A2 | 6/2005 |
|---|---|---|
| EP | 1713022 A1 | 10/2006 |

(Continued)

OTHER PUBLICATIONS

Japanese Notification of Reason(s) for Rejection dated May 14, 2012 issued in application No. 2009-524523.

(Continued)

*Primary Examiner* — John A Tweel, Jr.
(74) *Attorney, Agent, or Firm* — Smith, Gambrell & Russell, LLP

(57) ABSTRACT

A metal-resistant radio frequency tag that has a broader band pass band (frequency versus communication range) characteristic compared to conventional techniques is achieved. For this purpose, the radio frequency tag according to the present invention includes a first resonator pattern, the first resonator pattern including a chip connecting section to which a chip is to be connected, and an inductance section that is capable of adjusting an impedance matching with the chip; and a second resonator pattern that is fed through electromagnetic induction coupling via the inductance section.

21 Claims, 41 Drawing Sheets

(56) References Cited

U.S. PATENT DOCUMENTS

| | | |
|---|---|---|
| 2006/0032926 A1 | 2/2006 | Baba et al. |
| 2006/0243811 A1 | 11/2006 | Koyama et al. |
| 2007/0018893 A1 | 1/2007 | Kai et al. |
| 2007/0132594 A1 | 6/2007 | Masuta |
| 2007/0200711 A1 | 8/2007 | Kai et al. |
| 2008/0122630 A1 | 5/2008 | Baba et al. |
| 2009/0140947 A1 | 6/2009 | Sasagawa et al. |
| 2009/0256777 A1 | 10/2009 | Nagai |

FOREIGN PATENT DOCUMENTS

| | | |
|---|---|---|
| JP | 62274082 | 11/1987 |
| JP | 4157905 A | 5/1992 |
| JP | 7058539 A | 3/1995 |
| JP | 11127014 A | 5/1999 |
| JP | 2002111536 | 4/2002 |
| JP | 2002135029 A | 5/2002 |
| JP | 2005198168 | 7/2005 |
| JP | 2005236468 | 9/2005 |
| JP | 2005348197 A | 12/2005 |
| JP | 2006024817 | 1/2006 |
| JP | 200631766 | 2/2006 |
| JP | 200653833 | 2/2006 |
| JP | 2006067478 | 3/2006 |
| JP | 2006109396 | 4/2006 |
| JP | 2006140735 | 6/2006 |
| JP | 2006195795 A | 7/2006 |
| JP | 2006195796 | 7/2006 |
| JP | 2006209401 | 8/2006 |
| JP | 2006301827 | 11/2006 |
| JP | 2006309401 A | 11/2006 |
| JP | 2007150868 | 6/2007 |
| JP | 2007164479 | 6/2007 |
| JP | 2008042379 | 2/2008 |
| TW | 1254490 B | 5/2006 |
| TW | 1257580 B | 7/2006 |
| TW | 1267788 B | 12/2006 |
| WO | 2004025554 A1 | 3/2004 |
| WO | 2006049068 | 5/2006 |
| WO | 2006132032 | 12/2006 |

OTHER PUBLICATIONS

Chinese Patent Office issued the Office Action dated Apr. 26, 2012 received in Chinese Patent Application No. 200880100423.3.
B. Desai, et al. "Dual-Band Microstrip Patch Antenna", 2005 IEEE International Symposium on Microwave, Antenna, Propagation and EMC Technologies for Wireless Communications Proceedings, pp. 180-184, 2005.
International Search Report dated Sep. 2, 2008, International application No. PCT/JP2008/063408.
Taiwan Patent Office Action dated Dec. 20, 2012 issued in the corresponding Taiwan Patent Application No. 097128394.
Extended European Search Report dated May 14, 2013 issued in Application No. 08791652.4-1812/2173009.

* cited by examiner

RADIO FREQUENCY TAG AND METHOD OF MANUFACTURING THE SAME

CROSS-REFERENCE TO RELATED APPLICATION

This application is a continuation application of a PCT international application No. PCT/JP2008/63408 filed on Jul. 25, 2008 in Japan, the entire contents of which are incorporated by reference.

FIELD

The present application relates to a radio frequency tag and a method of manufacturing the same. Such a radio frequency tag can be used for a metal-resistant radio frequency tag that can be attached on metal, for example.

BACKGROUND

The RFID (Radio Frequency Identification) system has been known as one of wireless communication systems. Such an REID system generally includes a radio frequency tag (also referred to as an RFID tag) and a reader-writer (RW) apparatus, wherein information is read from or written into the radio frequency tag from the RW apparatus by means of wireless communication.

Known radio frequency tags include one type of tags that can operate by using a power source embedded in the radio frequency tag (such a type is referred to as "active tags") and another type of tags that operate by using radio waves received from a RW apparatus as driving power (such a type is referred to as "passive tags").

In an RFID system using a passive tag, the radio frequency tag operates an embedded integrated circuit, such as an IC, an LSI, or the like, using radio signals from an RW apparatus as driving power, and performs various processing in accordance with received radio signals (control signals). The transmission from the radio frequency tag to the RW apparatus is achieved using reflected waves of the received radio signals. That is, various information, such as a tag ID or results of the processing, is carried on the reflected waves, which is sent to the RW apparatus.

Note that a variety of frequency bands have been used for RFID systems, and recently the UHF band (860 MHz-960 MHz) is attracting attentions. The UHF band enables long distance communications, compared to the 13.56 MHz band or the 2.45 GHz band that have been conventionally used. Frequencies around 868 MHz, 915 MHz, and 953 MHz are used in Europe, in the United States, and in Japan, respectively. The communication ranges of radio frequency tags (hereinafter, simply referred to as "tags") in the UHF band are about between 3 meters and 5 meters, although they depend on an integrated circuit, such as an IC chip, an LSI, or the like, used in the tags. In addition, the output powers of RW apparatuses are about one watt (W).

Note that conventional radio frequency tags include those disclosed in Patent Reference 1 and Patent Reference 2 that are listed below, for example.

Patent Reference 1 discloses a planar antenna that can simplify the structure and reduce the cost, wherein the planar antenna includes a cut-out section that is formed by cutting the base plate into a certain shape from a certain edge. The folded structure is provided only in the cut-out section, which can reduce impedance, enabling matching to a 50Ω feed line without requiring additional circuits, such as an impedance conversion circuit.

Patent Reference 2 discloses a radio frequency tag including a planar antenna formed from a pair of antenna patterns and an IC chip connected to a feeding point of the planar antenna for the purpose of achieving a broader band coverage while reducing the antenna impedance in the radio frequency tag. In the antenna patterns forming the planar antenna, the increased pattern width at the sides distant from the feeding point is formed as a surface pattern with respect to the edge of the feeding point, thereby achieving a broader band coverage of the planar antenna (covering a width of 89 MHz). At the same time, an auxiliary pattern formed adjacent to the planar antenna is formed as a surface pattern having the same area as one antenna pattern of the planar antenna, instead of forming as a linear antenna for reducing the antenna impedance.

Typical sheet-like radio frequency tags that are designed to be attached to a corrugated cardboard or a plastic surface have pass bandwidths of about 200 MHz, and thus can cover the operating frequencies used in all of Europe, the United States, and Japan. However, metal-resistant tags that can be attached on a metal surface have quite narrow pass bands and are designed to be country-specific.

For example, if a planar antenna that has the shape depicted in FIG. 16 and has the communication range characteristic with respect to frequency as depicted in FIG. 15, when the central frequency is adjusted to the operating frequency used in the United States (US), the communication range is extremely dropped at the operating frequencies used in the Europe (EU) and Japan (JP) which are located at two ends. When the central frequency is adjusted to the operating frequency in Europe or Japan, the communication range is similarly extremely dropped at operating frequencies of other regions. In addition, even when used within the same country, the communication range of tags is dropped due to the shift of the frequency characteristic if the tags are attached to a curved surface, or the permittivity ($\in$r) or the thickness (t) of dielectric substrates (spacer substrates) that are included in the tags.

Accordingly, tags that can be attached on a metal surface and has a broader band frequency characteristic covering all of the operating frequencies used in Europe, the United States, and Japan are desired.

Although patch antennas are typically used for such metal-resistant tags, it is also possible to arrange multiple patch antennas having different sizes in order to achieve a broader band coverage, for example. Non-Patent Reference 1 that is described later discloses an example of such a configuration, although it is not for an RFID tag.

According to Non-Patent Reference 1, when multiple patch antennas are arranged on the same plane, as depicted in FIG. 1 of Non-Patent Reference 1, in order to prevent the patch antennas from interfering with each other, the patch antenna are required to be spaced apart with a spacing of at least half wave (0.5λ).

Patent Document 1: Japanese Laid-Open Patent Publication No. 2006-140735

Patent Document 2: Japanese Laid-Open Patent Publication No. 2006-109396

Non-Patent Reference 1: Desai, B.; Gupta, S., "Dual-band microstrip patch antenna", Microwave, Antenna, Propagation and EMC Technologies for Wireless Communications, 2005. MAPE 2005. IEEE International Symposium on Volume 1, 8-12 Aug. 2005 Page (s): 180-184 Vol. 1

SUMMARY (1) According to an aspect of the invention, a radio frequency tag includes: a first resonator pattern, the first resonator pattern including a chip connecting section to which a chip is to be connected, and an inductance section that is capable of adjusting an impedance matching with the chip; and a second resonator pattern that is fed through electromagnetic induction coupling via the inductance section.

(2) Here, the first and second resonator patterns may include a respective rectangular conductor pattern, and may be arranged in parallel on the same plane.

(3) In addition, the same plane may be one of the faces of a dielectric substrate.

(4) Furthermore, a reflecting layer may be further provided on the other face of the dielectric substrate.

(5) In addition, it is preferable that the inductance section is formed by providing a slit in a part of the first resonator pattern.

(6) Furthermore, it is preferable that the first and second resonator patterns have different electrical lengths in the direction in which the first and second resonator patterns are arranged in parallel with each other.

(7) For example, it is preferable that the length of the first resonator pattern in the direction in which the first resonator pattern is arranged in parallel with the second resonator pattern is longer than the length of the second resonator pattern.

(8) In addition, the first and second resonator patterns may be formed of an electrically conductive material on a sheet-like member that is applied on one side of a resin substrate that is a dielectric substrate.

(9) Furthermore, a resin material that covers the first and second resonator patterns may be provided.

(10) In addition, the chip may be connected to the chip connecting section.

(11) Furthermore, the first and second resonator patterns may be attached to a metal via a dielectric material.

(12) In addition, a conductor pattern may be provided in a portion including a region of the other face of the dielectric substrate, the region facing the first and second resonator patterns, and the conductor pattern and the first and second resonator patterns may be electrically connected on a path via one side face of the dielectric substrate.

(13) Furthermore, a side conductor that electrically connects between the conductor pattern and the first and second resonator patterns may be provided on the one side face.

(14) In addition, the side conductor may be a metal plating or electrically conductive sheet-like member.

(15) Furthermore, the side conductor may be integrally formed with one or both of the conductor pattern, and the first and second resonator patterns.

(16) In addition, the conductor pattern may be a resonator pattern that is common to the first and second resonator patterns.

(17) Furthermore, a third resonator pattern that is fed through electromagnetic induction coupling via the inductance section may be further provided, wherein, on the face including the first and second resonator patterns, the second and third resonator patterns may be provided such that the second and third resonator patterns are arranged symmetrically about the first resonator pattern.

(18) In addition, the third resonator pattern may have an electrical length that is shorter than the electrical lengths of the first and second resonator patterns.

(19) Furthermore, a resin material that entirely covers the first and second resonator patterns, and the conductor pattern may be provided.

(20) In addition, according to an aspect of the invention, a method of manufacturing the radio frequency tag, a method of manufacturing a radio frequency tag includes: forming a first resonator pattern and a second resonator pattern that is fed through electromagnetic induction coupling via an inductance section on a sheet-like member that can cover three faces of four faces defining the surrounding edge length in the longitudinal direction of a dielectric substrate in a region corresponding to one side and side faces of the dielectric substrate, the three faces are faces other than one of the side faces of the dielectric substrate opposing to the longitudinal direction, the first resonator pattern including a chip connecting section to which a chip is to be connected and the inductance section that is capable of adjusting an impedance matching with the chip; forming a conductor pattern that electrically communicates with each of the resonator patterns in a region corresponding to the other face of the dielectric substrate of the sheet-like member; and securing the sheet-like member to the dielectric substrate by wrapping the dielectric substrate with the sheet-like member such that the first and second resonator patterns are arranged on one side of the dielectric substrate whereas the conductor pattern is arranged on the other face of the dielectric substrate.

(21) Here, a guide member for aligning the sheet-like member upon the wrapping on the dielectric substrate may be provided.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

As described previously, the spacing of the half wave becomes about 17 cm for UHF band RFID tags, the size of the RFID tags becomes enormous, which is not practical. Typical non-metal-resistant RFID tags generally have a dimension of 100 mm×20 mm, although the dimensions vary depending on the manufacturers. It is desirable that the dimension of UHF band RFID tags is a compact size comparable to this, and that the frequency characteristic is to be set as flat as possible so as to cover all of the operating frequencies used in Europe, the United States, and Japan.

When patch antennas are arranged in a conventional manner, a spacing of about at least half wave is required. If the patch antennas are too close with each other, a shortcoming of extreme drop of the communication range near the central frequency will occur since the patch antennas interfere with each other.

Note that the techniques disclosed in Patent Reference 1 and Patent Reference 2 cannot solve the above-identified problems since the tags are not designed to be attached on a metal surface.

Preferred embodiments of the present invention will be explained with reference to accompanying drawings.

(A) One Embodiment

Figure 1:
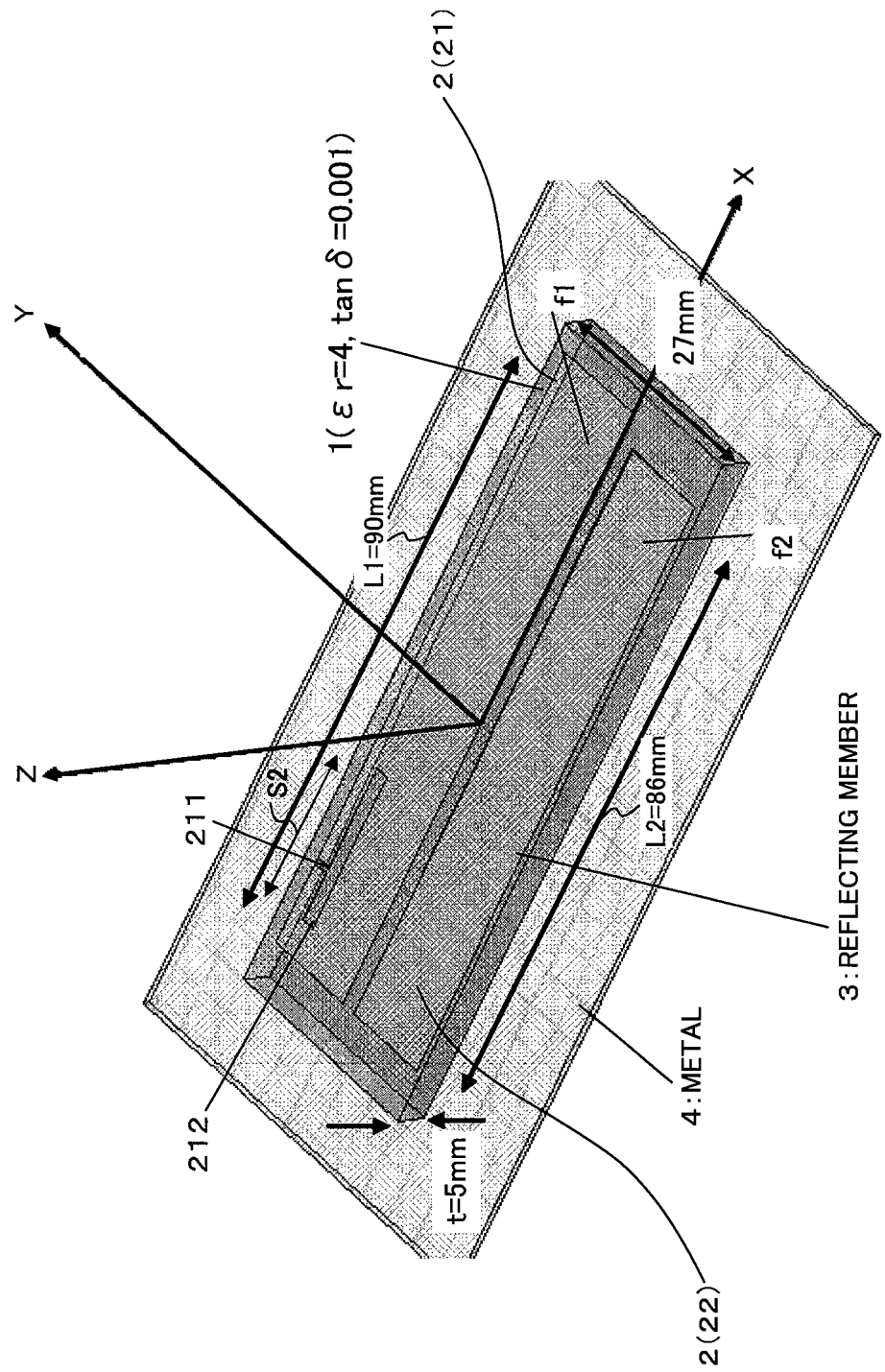
FIG. 1 is a schematic perspective view illustrating the configuration of a radio frequency tag according to one embodiment.

FIG. 1 is a schematic perspective view illustrating the configuration of a radio frequency tag according to one embodiment. The radio frequency tag depicted in FIG. 1 is designed to be attached on a metal 4, and antenna patterns 2 (21 and 22) is formed on one face (the front face in FIG. 1) of a flat-shaped dielectric spacer (dielectric substrate) 1 having a thickness t of 5 mm, a relative permittivity $\in_r$ of 4, and a dielectric dissipation factor tan δ of 0.001.

A reflecting member (reflector) 3 that is made of metal is preferably provided on the other face of the dielectric spacer (hereinafter, simply referred to as "spacer") 1 (back face in FIG. 1) so that the similar characteristics are maintained even when the radio frequency tag is attached on a non-metal object. The reflecting member 3 may be omitted.

The antenna patterns 2 includes a first conductor pattern 21 that has a length L1 in the X-axis direction in FIG. 1 of 90 mm and a band shape (rectangular shape) and a second conductor pattern 22 that has a length L2 in the X-axis direction of 86 mm and a band shape (rectangular shape). These patterns are provided 2 mm spaced apart on the spacer 1 in the Y-axis direction in FIG. 1.

The first conductor pattern 21 functions as a resonator pattern having a resonance frequency f1, and the second conductor pattern 22 functions as a resonator pattern having a resonance frequency f2 that is greater than the resonance frequency f1. In addition, the length (width) in the Y-axis direction of the antenna pattern 2 is 27 mm including the above-identified spacing of 2 mm. Thus, the dimension of the spacer 1 depicted in FIG. 1 includes at least a length of 90 mm, a width of 27 mm, and a thickness (t) of 5 mm.

An impedance matching of the antenna pattern 2 in the radio frequency tag with an integrated circuit, such as an IC chip or an LSI, (hereinafter, referred to as a "chip") used within the radio frequency tag. This chip may be represented with a parallel capacitance component Ccp and a parallel resistance component Rcp, as depicted in the right side in FIG. 6, for example. Although the specific values of resistance components may vary depending on manufacturers, Ccp is around 1 pF (picofarad) and Rcp is between 200Ω and 20000Ω.

Figure 6:
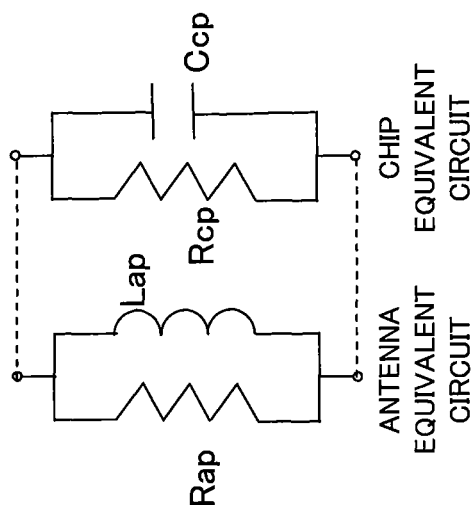
FIG. 6 is a diagram illustrating one example of the equivalent circuit of an antenna and a chip in the radio frequency tag.

Thus, the antenna equivalent circuit that matches with this chip may be represented with a parallel inductance component Lap that resonates with the capacitance component Ccp and a parallel resistance Rap that is comparable with the resistance component Rcp, as depicted in the left side in FIG. 6.

That is, the antenna pattern 2 may require having the inductance component Lap and the radiation resistance component Rap. Note that this is not limited to metal-resistant radio frequency tags, and applies to all of RFID radio frequency tags.

For this reason, a chip connecting section (feeding point) 211 and an inductance section 212 are formed on the first resonator pattern 21 to which the integrated circuit, such as an IC chip, an LSI, or the like, (hereinafter, referred to as a "chip") is connected.

It is desirable that the inductance section 212 is formed by forming slits having a length S2 in the X-axis direction (the length (width) in the Y-axis direction is 2 mm in FIG. 1) in a part of the first resonator pattern 21 since such a configuration contributes to space-saving. Alternatively, a similar inductance component may be provided (formed) in a part of the first resonator pattern with a manner other than providing the slits, such as providing a loop-shaped line from the chip connecting section 211.

Note that the inductance value may be adjusted by varying the entire length of the slits (loop length). That is, the matching with the chip impedance can be adjusted. For example, the inductance is increased as the inductance length S2 increases.

Furthermore, since the first resonator pattern 21 includes the inductance section 212, it is desirable that the length in the X-axis direction of the first resonator pattern 21 is configured to be longer than that of the second resonator pattern 22 for obtaining different resonance frequencies f1 and f2 (f1<f2). The permittivity of the spacer 1 may be partially modified to increase the electrical length of the first resonator pattern 21 greater than the second resonator pattern 22.

In the radio frequency tag configured as described above, the inductance section 212 in the first resonator pattern 21 plays the following three roles:

(1) The inductance for matching with the chip
(2) The direct feed to the first resonator pattern 21
(3) The electromagnetic coupling feed to the second resonator pattern 22

Figure 7:
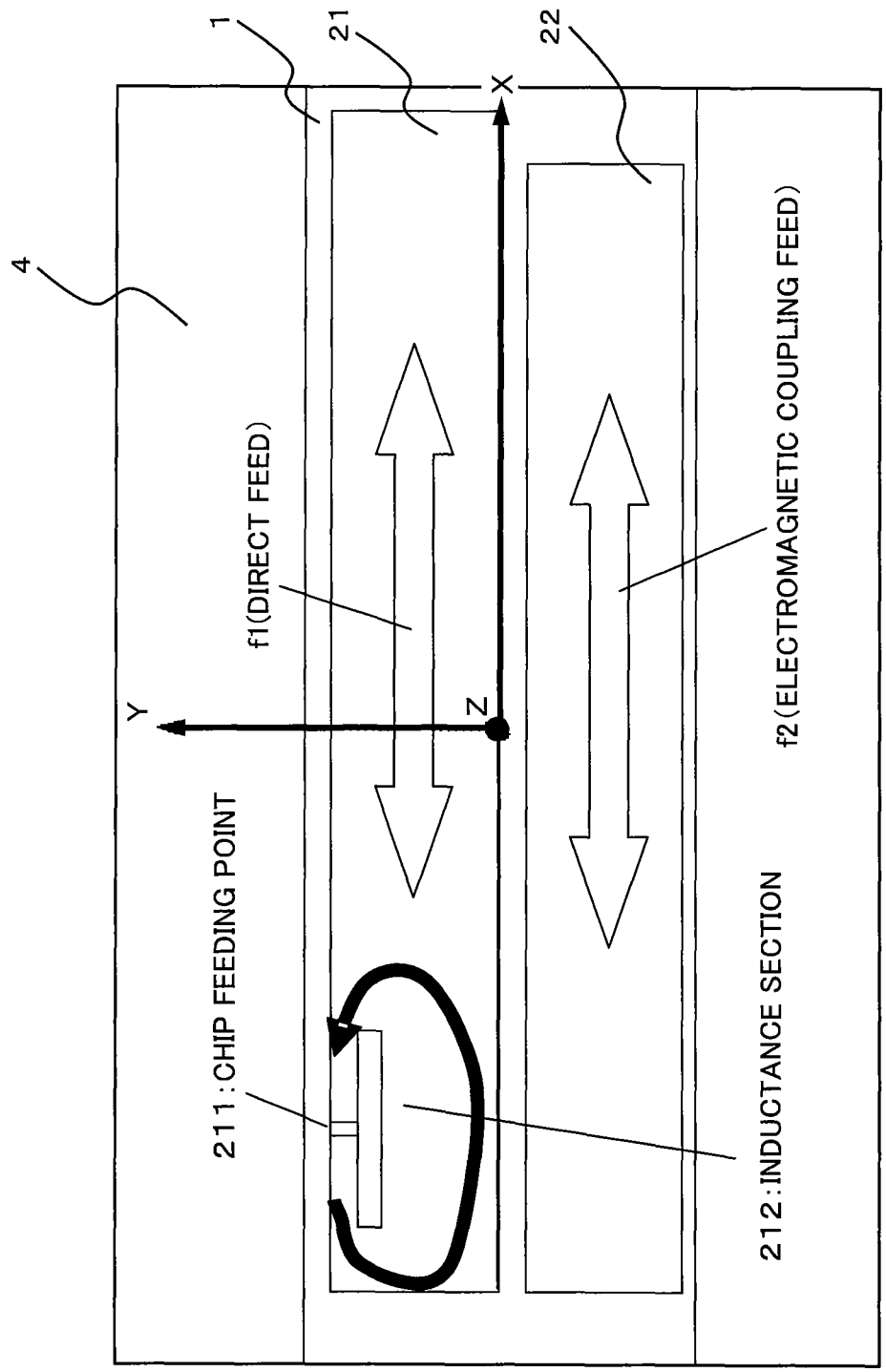
FIG. 7 is a plan view illustrating the operation of the radio frequency tag depicted in FIG. 1.

If power is provided from the feeding point 211 to the first resonator pattern 21 as depicted in FIG. 7, for example, a large amount of current is flown into the inductance section 212 as indicated by an arrow (the current distribution of the inductance section 212 becomes dense). Thus, this part (the inductance section 212) functions as a power source for the second resonator pattern 22. That is, although the inductance section 212 and the second resonator pattern 22 are not directly coupled each other (they are spaced apart by 2 mm), they are provided with power by means of electromagnetic coupling via the inductance section 212 since they electromagnetic induction couple.

In conventional techniques, placing patch antennas close to each other with such a small distance of 2 mm has been prohibited since they interfere with each other and the antenna performance is reduced. The inductance section 212 is regarded as a power source to the second resonator pattern 22 by employing electromagnetic induction coupling via the inductance section 212 in this manner.

Accordingly, when the resonator patterns 21 and 22 are long distance apart, the strength of coupling between them is reduced, and this leads to insufficient power feed to the second resonator pattern 22, which hinders radio waves to radiate.

That is, it is possible to reduce the entire size of the antenna pattern 2 by placing the resonator patterns 21 and 22 in such a close distance that the inductance section 212 is regarded as a power source to the second resonator pattern 22.

In other words, the position in which the inductance section 212 (slit) is provided is preferably the position in which the direct feed to the first resonator pattern 21 and electromagnetic coupling feed to the second resonator pattern 22 are adequately obtained. The position may be set at offset from the center in the length direction (X-axis direction) of the first resonator pattern 21, is preferably set at the proximity of the edge as depicted in FIG. 1, for example.

The results of calculation of a characteristic in this example performed using a three-dimensional electromagnetic field simulator will be explained.

Figure 3:
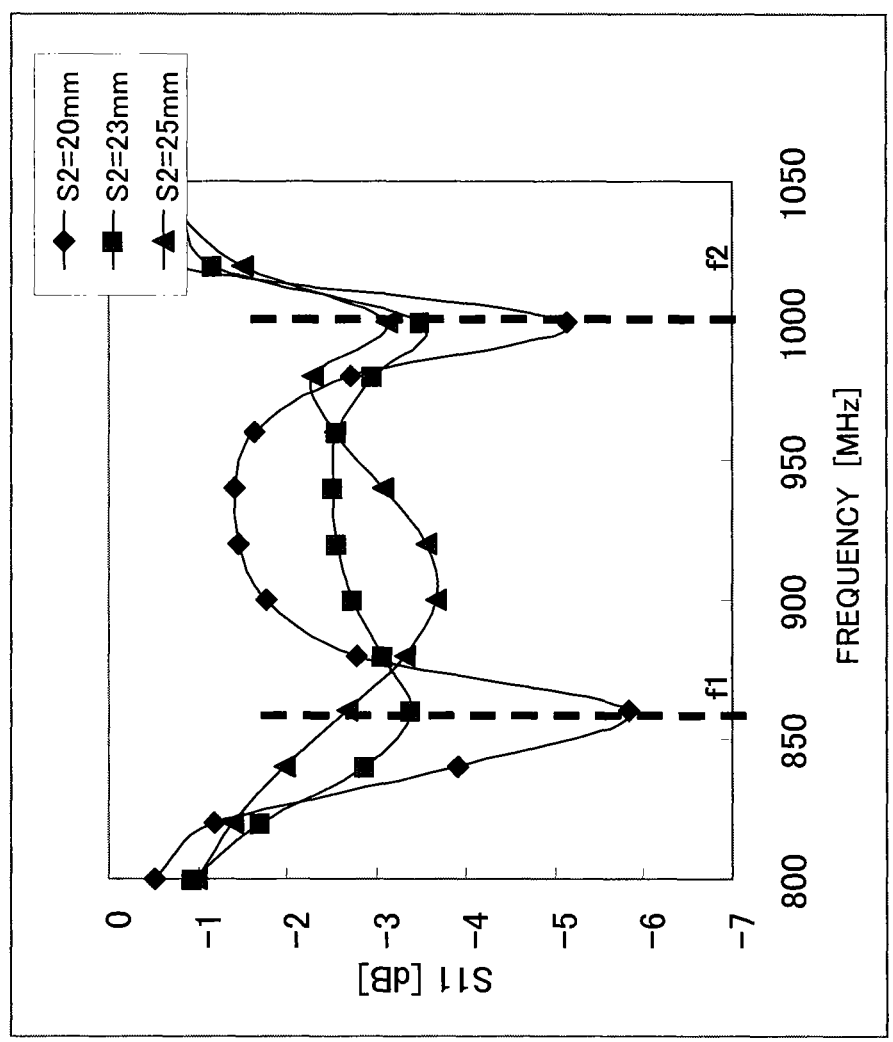
FIG. 3 is a graph illustrating one example of the reflection characteristic of the radio frequency tag depicted in FIG. 1.

Firstly, the reflection characteristics (S11) of the chip and the antenna pattern 2 are depicted in FIG. 3. S11 on the vertical axis indicates higher reflection amount as it is closer to zero whereas better matching as the value is smaller (minus values), That is, the input power of the antenna pattern 2 is more easily transmitted to the chip connecting section 211 (i.e., the chip).

In this calculation example, it is assumed that the capacitance component of the chip Ccp is 1.4 pF and the resistance component Rcp is 400Ω. The degree of matching varies with the inductance length S2 (here, three lengths are provided: S2=20 mm, 23 mm, and 25 mm), and it is understood that there are two resonance points at different frequencies f1 and f2.

Figure 4:
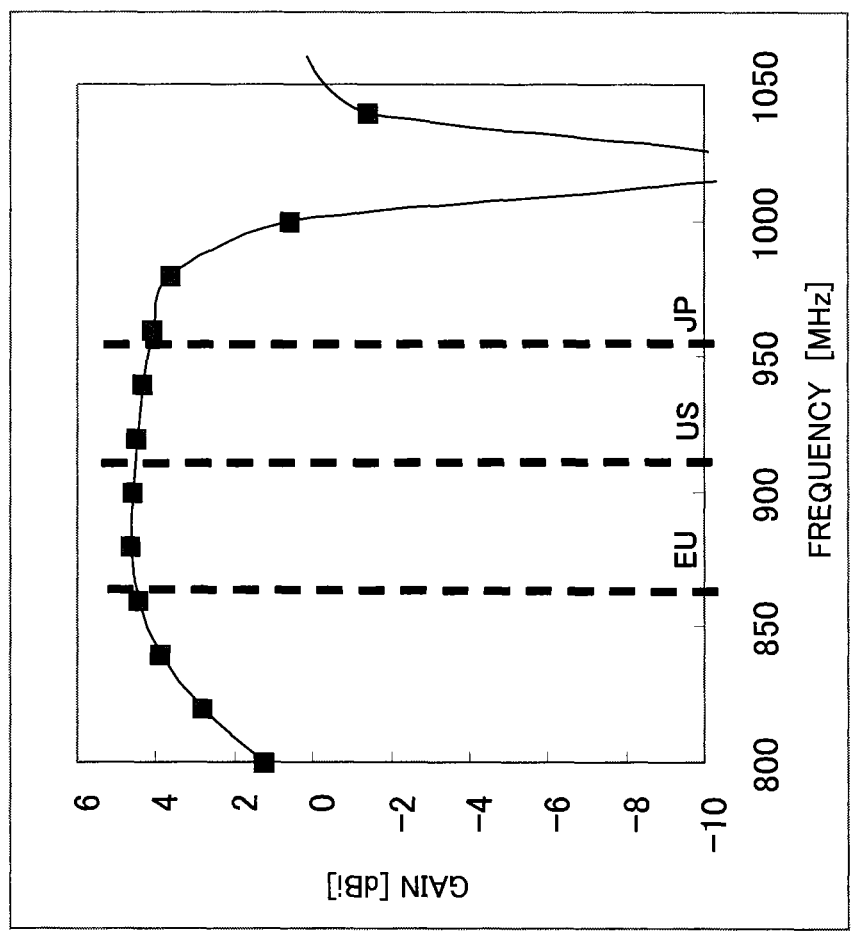
FIG. 4 is a graph illustrating one example of the gain characteristic of the radio frequency tag depicted in FIG. 1.

The values of the resonance frequencies f1 and f2 may be controlled (adjusted) using the length L1 of the resonator pattern 21 and the length L2 of the resonator pattern 22, respectively. For example, the resonance frequency f1 moves (shifts) towards a lower frequency side when the length L1 is increased, whereas the resonance frequency f2 moves (shifts) towards a higher frequency side when the length L2 is reduced. That is, it is possible to adjust the pass bandwidth of the radio frequency tag. Note that the antenna gain is substantially constant as the frequency varies at the frequency band that covers operating frequencies used in Europe, the United States, and Japan, as depicted in FIG. 4.

Figure 2:
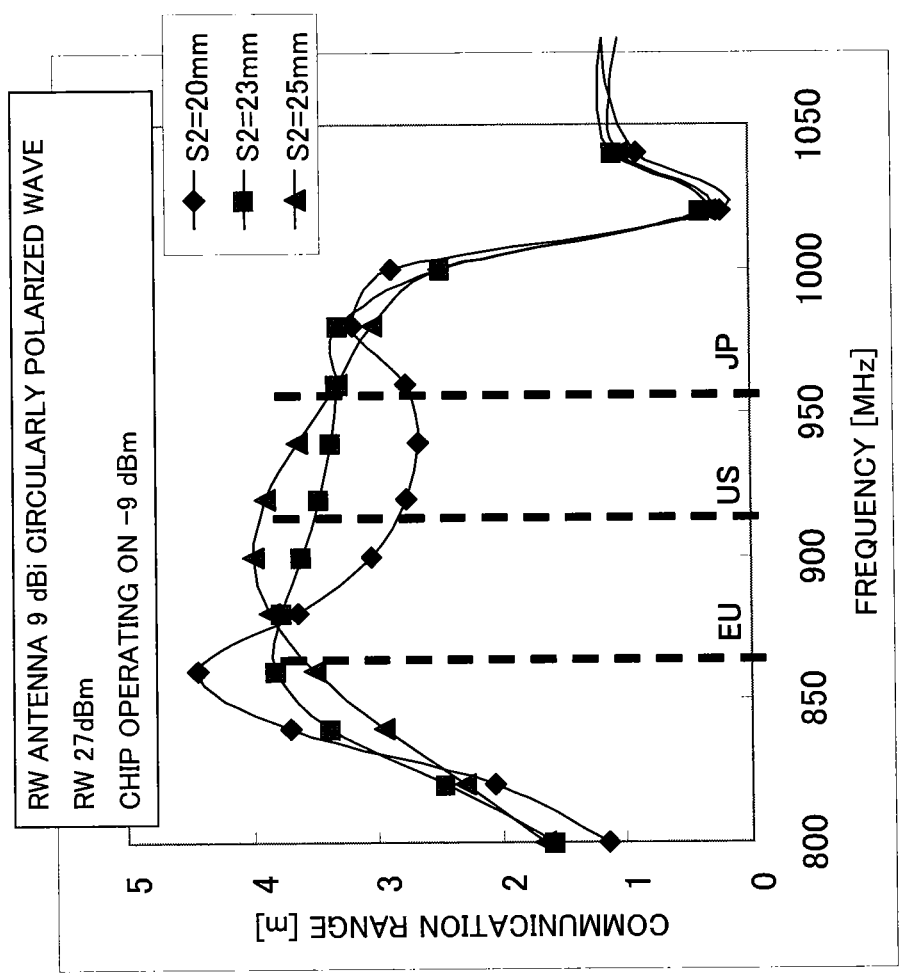
FIG. 2 is a graph illustrating one example of the communication range characteristic of the radio frequency tag depicted in FIG. 1.

The communication range characteristic is calculated considering all of the above factors, and is illustrated in FIG. 2. As depicted in FIG. 2, the most flat characteristic is obtained at the frequency band that covers operating frequencies used in Europe, the United States, and Japan, when the inductance length S2 is set to 23 mm. Note that the communication range refers to the communication range in the Z-axis direction in FIG. 1, and calculation conditions are as follows: an antenna of an RW apparatus (RW antenna) is a circularly polarized wave antenna of 9 dBi, the power of the RW antenna is 27 dBm (0.5 W), and the operating power of a chip is −9 dBm.

Figure 5:
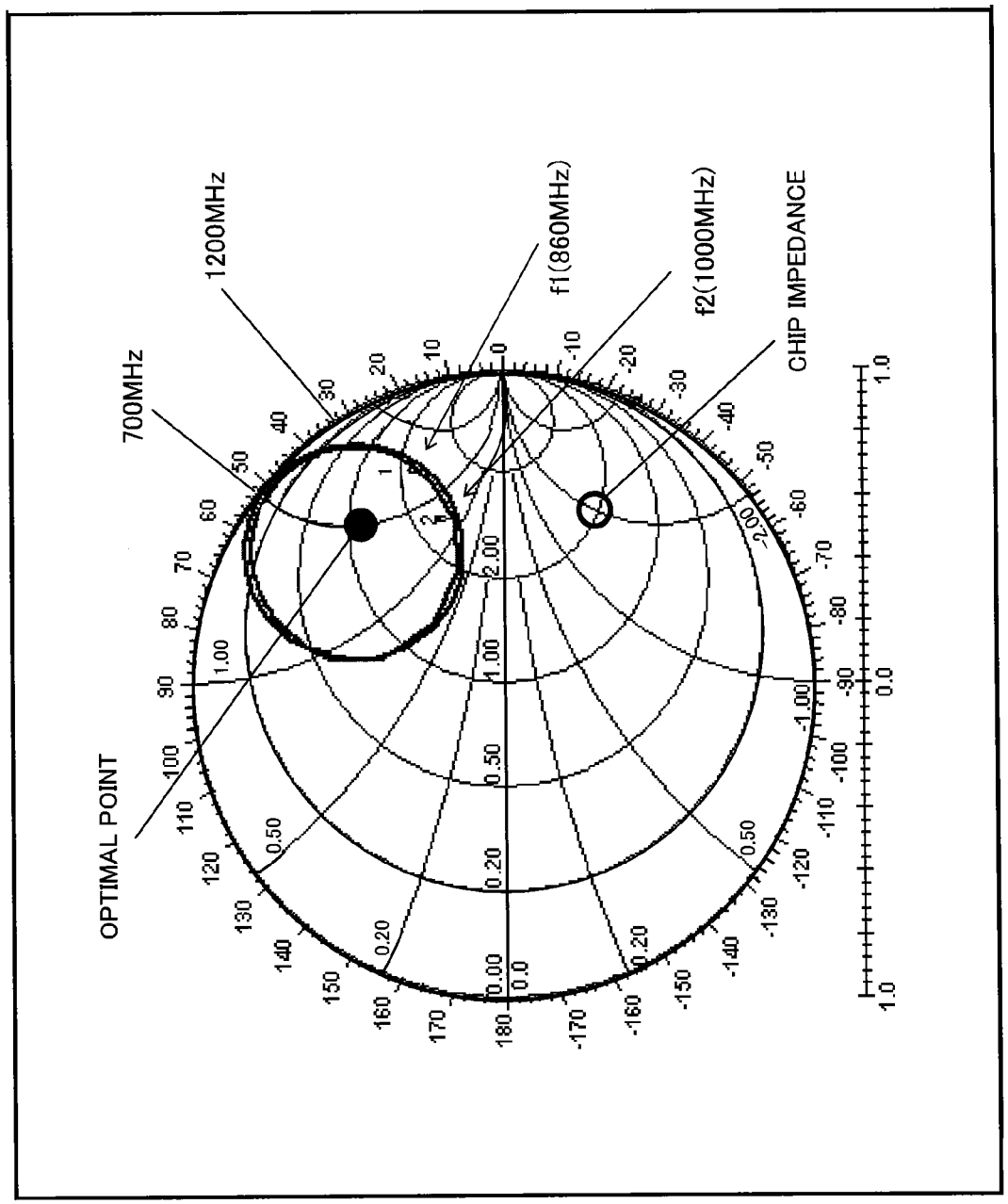
FIG. 5 is a Smith chart illustrating the chip impedance and the antenna impedance of the radio frequency tag depicted in FIG. 1.
Figure 8:
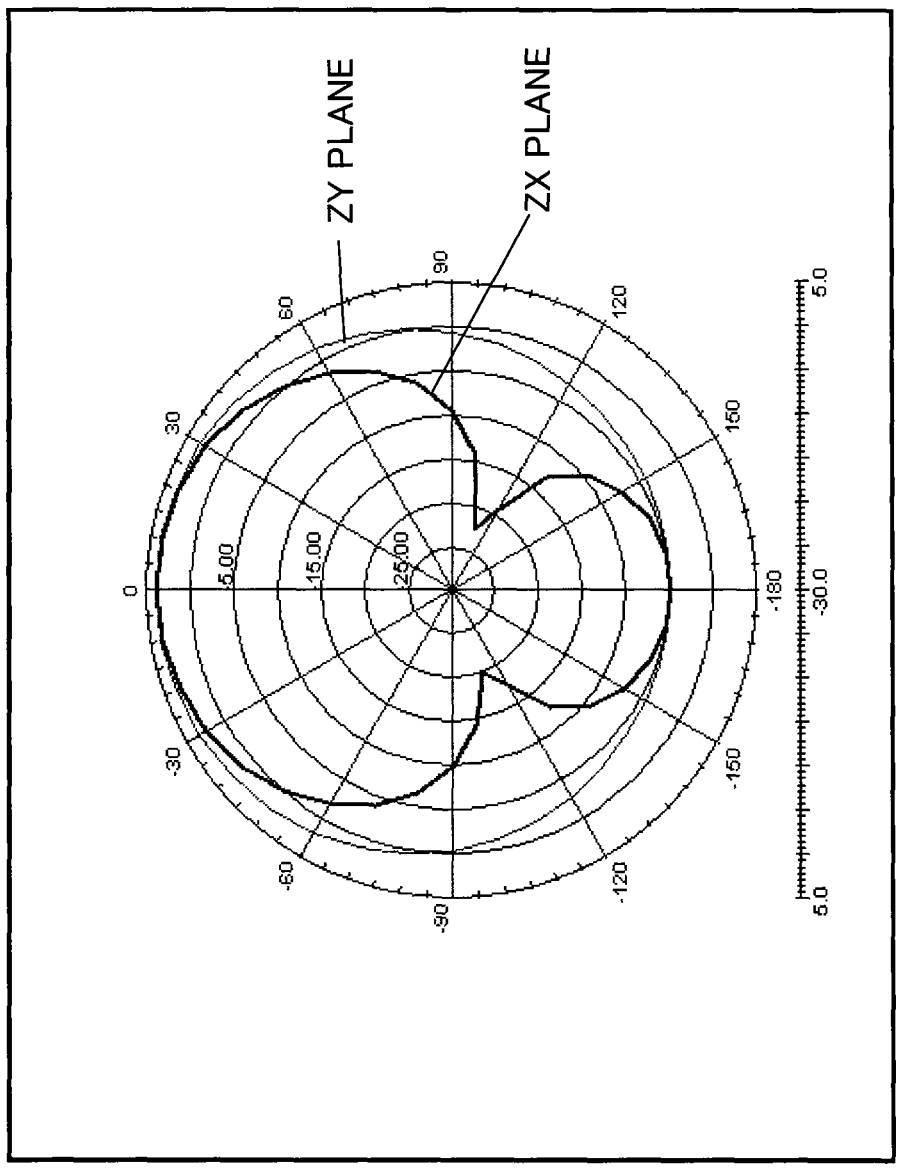
FIG. 8 is a diagram illustrating directivity of the antenna pattern of the radio frequency tag depicted in FIG. 1 (the directivity with respect to the ZY plane and the ZX plane in FIG. 1)

Next, the locus of the antenna impedance on a Smith chart when the operating frequency is varied from 700 MHz to 1200 MHz is illustrated in FIG. 5. The optimal point of the antenna impedance is the point that is symmetrical with respect to the chip impedance (i.e., a complex conjugate number of the chip impedance) on the Smith chart, and it is desirable that the locus of the antenna impedance becomes a small circle about this point. Since the impedance locus goes about the optimal point twice in FIG. 5, it is understood that there are two resonance points at the frequencies f1 (860 MHz) and f2 (1000 MHz). Note that the directivity of the antenna pattern 2 in this example (the directivity with respect to the ZY plane and the ZX plane in FIG. 1) is illustrated in FIG. 8.

As described above, according to the radio frequency tag of this embodiment, since it is possible to provide a metal-resistant radio frequency tag having a broader-band pass band characteristic that covers operating frequencies used in Europe, the United States, and Japan, a metal-resistant radio frequency tag that can maintain a communication range that is common to each country can be realized.

In addition, since the pass band characteristic can be broadened, even when the frequency characteristic of the pass band is shifted towards the high-frequency side or the low-frequency side because the radio frequency tag is attached on a curved surface, such as a gas cylinder, or the permittivity or the thickness of the spacer 1 deviates due to a manufacturing error, for example, it is possible to maintain a reliable characteristic (communication range) anytime by designing the pass band to be wider than a frequency band that covers operating frequencies used in Europe, the United States, and Japan, even slightly wider.

Figure 9:
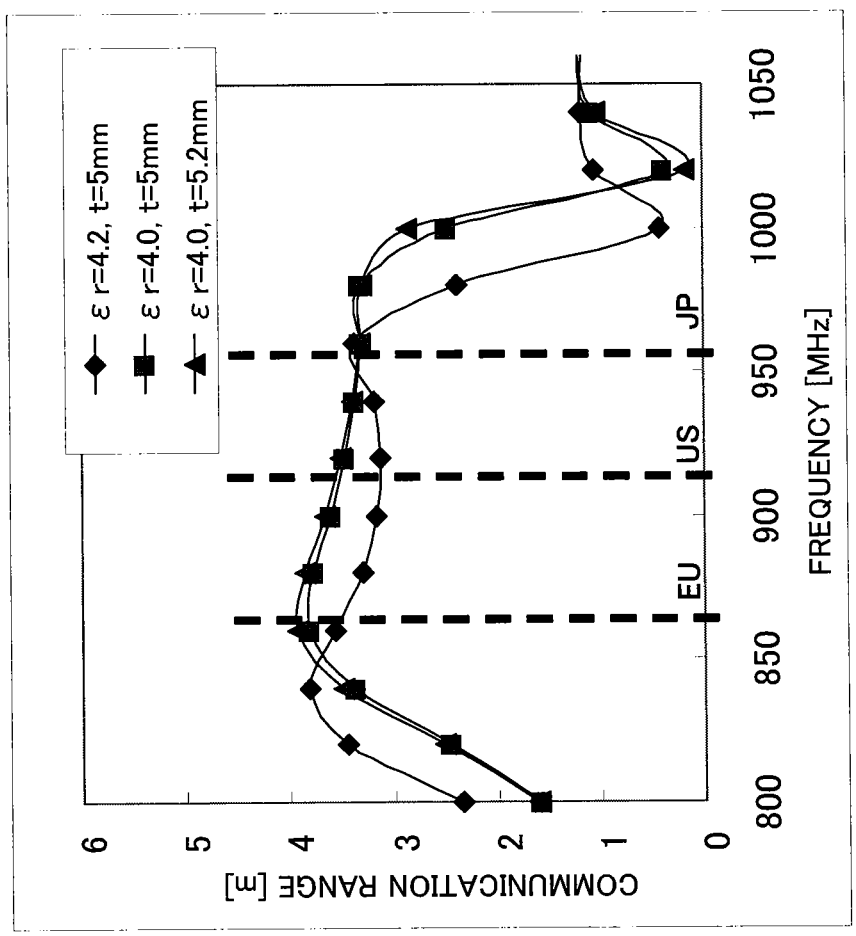
FIG. 9 is a graph illustrating one example of communication range characteristics of the radio frequency tag depicted in FIG. 1 when the permittivity or the thickness of a spacer thereof is varied.

For example, the calculation result of manufacturing errors is illustrated in FIG. 9. Even when the permittivity ∈r becomes 4.2 or the thickness t becomes 5.2 mm due to a manufacturing error with respect to the standard permittivity of the spacer 1 ∈r of 4.0 and the standard thickness t of the spacer 1 of 5 mm, it is possible to maintain the communication range in Europe, the United States, and Japan to be substantially constant.

Figure 10:
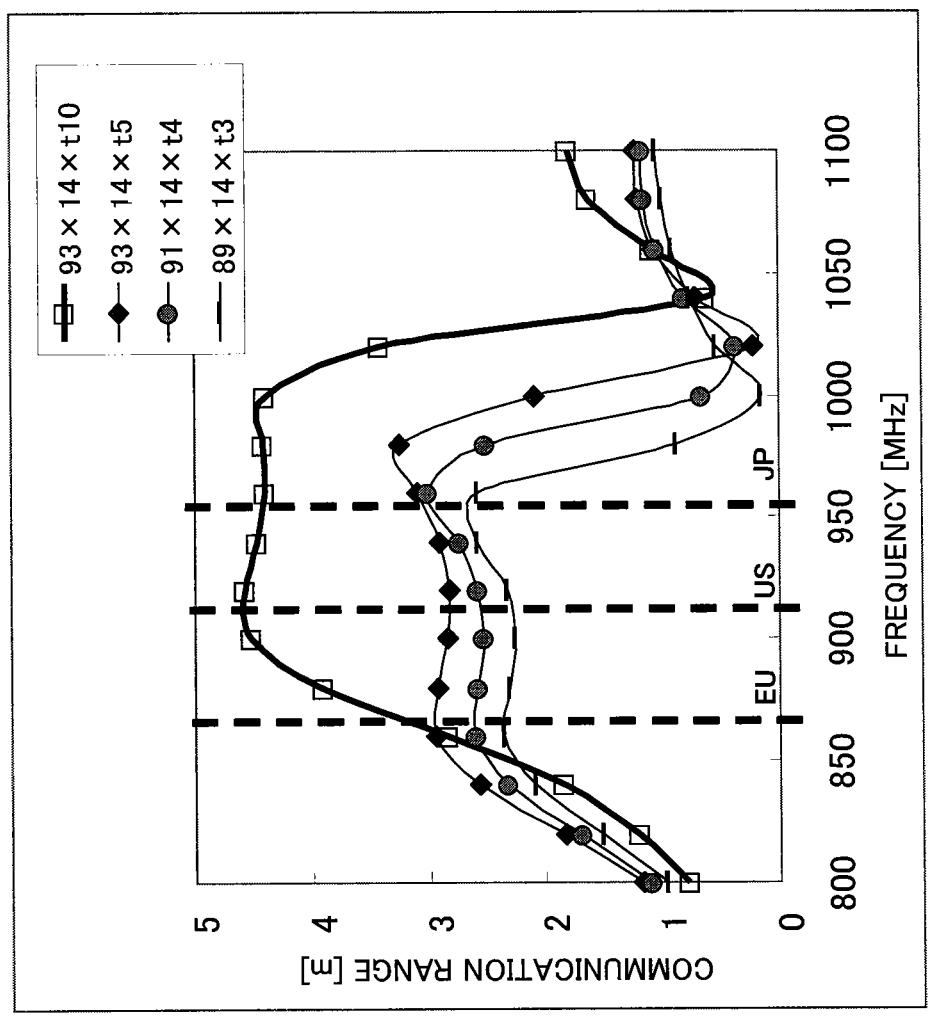
FIG. 10 is a graph illustrating one example of communication range characteristics of the radio frequency tag depicted in FIG. 1 when the size (primarily the thickness) of the spacer thereof is varied.

In addition, calculation results when the thickness t of the spacer 1 is varied to 3 mm, 4 mm, 5 mm, and 10 mm while fixing the width thereof Y-axis direction in FIG. 1) (that is, the width of the antenna pattern 2) to 14 mm are illustrated in FIG. 10. FIG. 10 indicates that the communication range increases at the frequency band that covers operating frequencies used in Europe, the United States, and Japan, as the thickness t increases. However, when t is 10 mm, it is too thick for a radio frequency tag, and thus this thickness is impractical. Conversely, when the t is reduced to about 3 mm, thin-type tags can be achieved since communication range that is acceptable in practical use, although drop in the communication range is the greatest.

Figure 11:
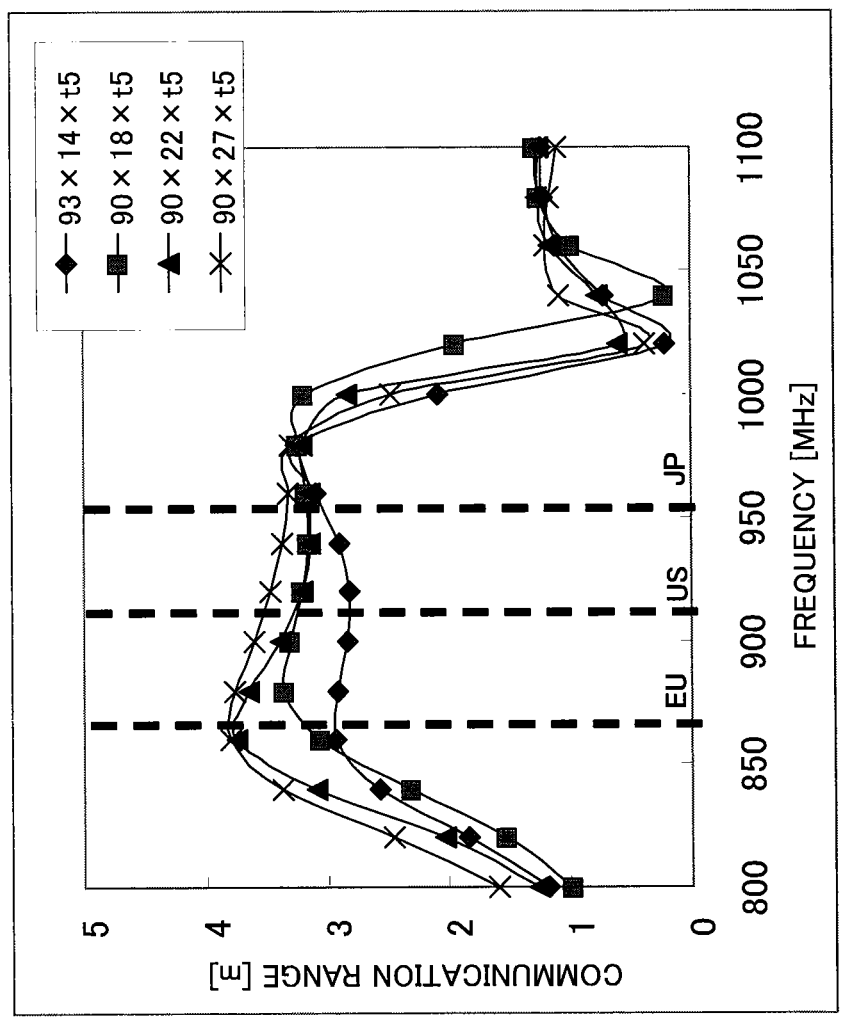
FIG. 11 is a graph illustrating one example of communication range characteristics of the radio frequency tag depicted in FIG. 1 when the size (primarily the width) thereof is varied.

Furthermore, calculation results when the length (90 mm) and the width (27 mm) of the spacer 1 are varied using the dimension of the spacer 1 depicted in FIG. 1 (a length of 90 mm, a width of 27 mm, and a thickness (t) of 5 mm) as a reference are illustrated in FIG. 11. FIG. 11 indicates that the drop in communication range at the frequency band that covers operating frequencies used in Europe, the United States, and Japan is small when the width is reduced to 14 mm.

Figure 12:
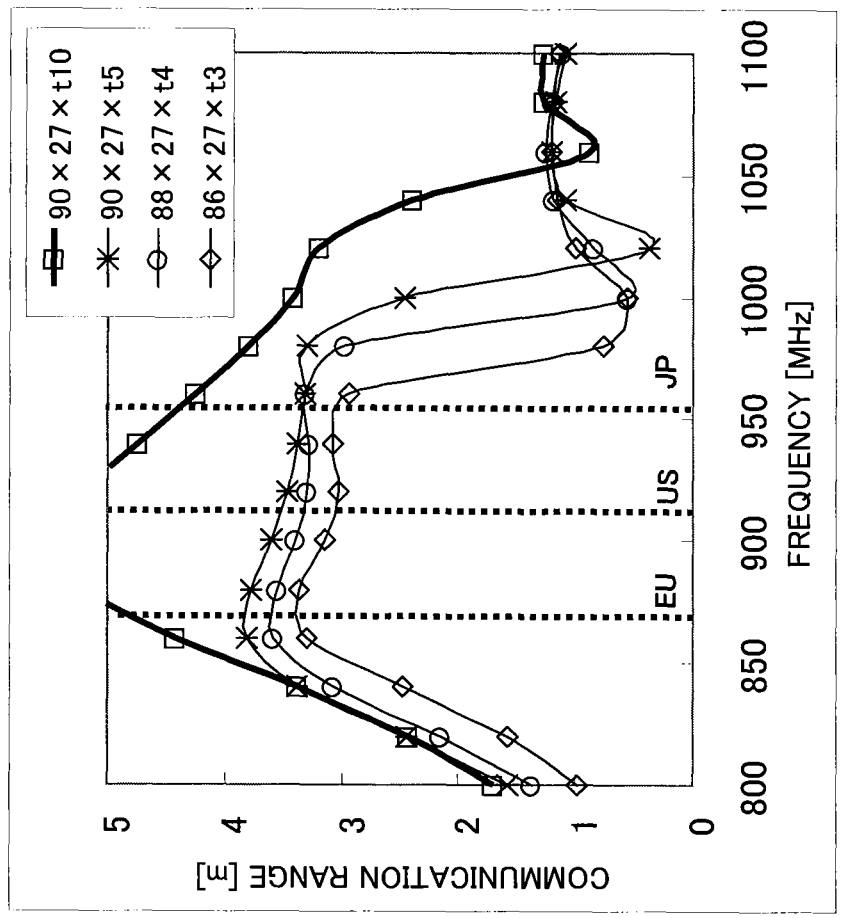
FIG. 12 is a graph illustrating one example of communication range characteristics of the radio frequency tag depicted in FIG. 1 when the size (primarily the thickness) of the spacer thereof is varied.

In addition, calculation results when a width of 27 mm of the spacer 1 is fixed and the length (90 mm) and the thickness t (5 mm) are varied using the dimension of the spacer 1 depicted in FIG. 1 (a length of 90 mm, a width of 27 mm, and a thickness (t) of 5 mm) as a reference are illustrated in FIG. 12. FIG. 12 indicates a communication range of 3 meters or longer can be maintained at the frequency band that covers operating frequencies used in Europe, the United States, and Japan, even when the thickness t is reduced (to 3 mm) since the width is as large as 27 mm.

As described above, since it is possible to change and design the permittivity or the size of the spacer 1 (the size of the radio frequency tag) as desired, specific values of the dimension, the permittivity of the spacer 1 ∈r, or the size are merely exemplary.

(Manufacturing Method)

Figure 13:
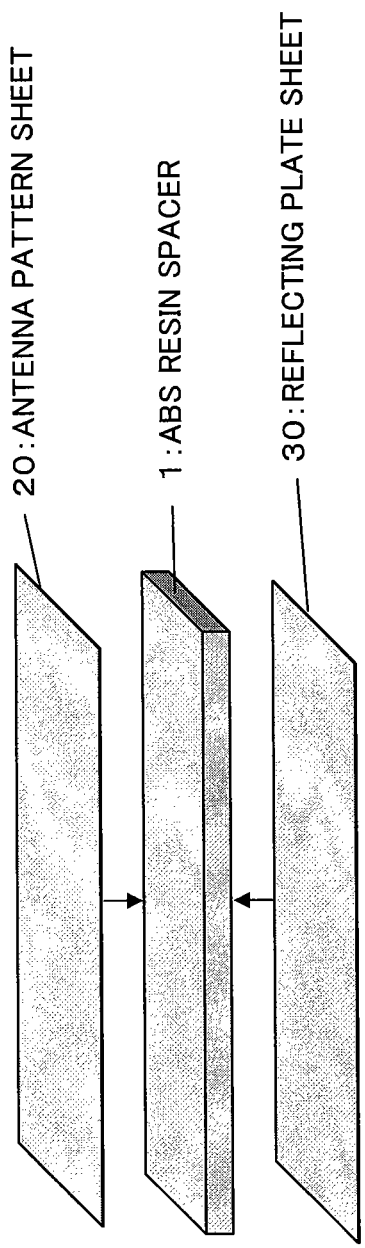
FIG. 13 is a schematic diagram illustrating one example of a method of manufacturing the radio frequency tag depicted in FIG. 1.

Next, the radio frequency tag of the above-described example can be manufactured, as schematically depicted in FIG. 13, for example. An antenna pattern sheet 20 having the antenna pattern 2 (the resonator patterns 21 and 22) formed thereon is provided by applying (e.g., printing) an electrically conductive material, such as copper (Cu), silver (Ag), aluminum (Al), on a sheet-like member, such as a film or a sheet of paper. A reflecting sheet (sheet-like reflecting member) 30 having a reflection plate 3 formed by applying (e.g., printing) Cu, Ag, Al, or the like on another sheet-like member, such as a film or a sheet of paper. The two sheets are attached by adhering them together using adhesive agent, lamination, or other method.

Figure 14:
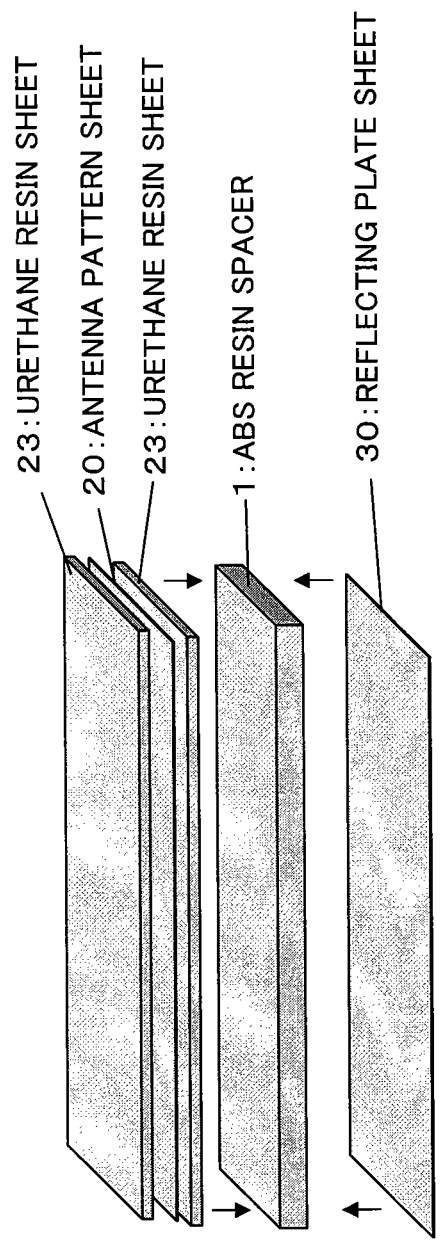
FIG. 14 is a schematic diagram illustrating one example of a method of manufacturing the radio frequency tag depicted in FIG. 1.
Figure 15:
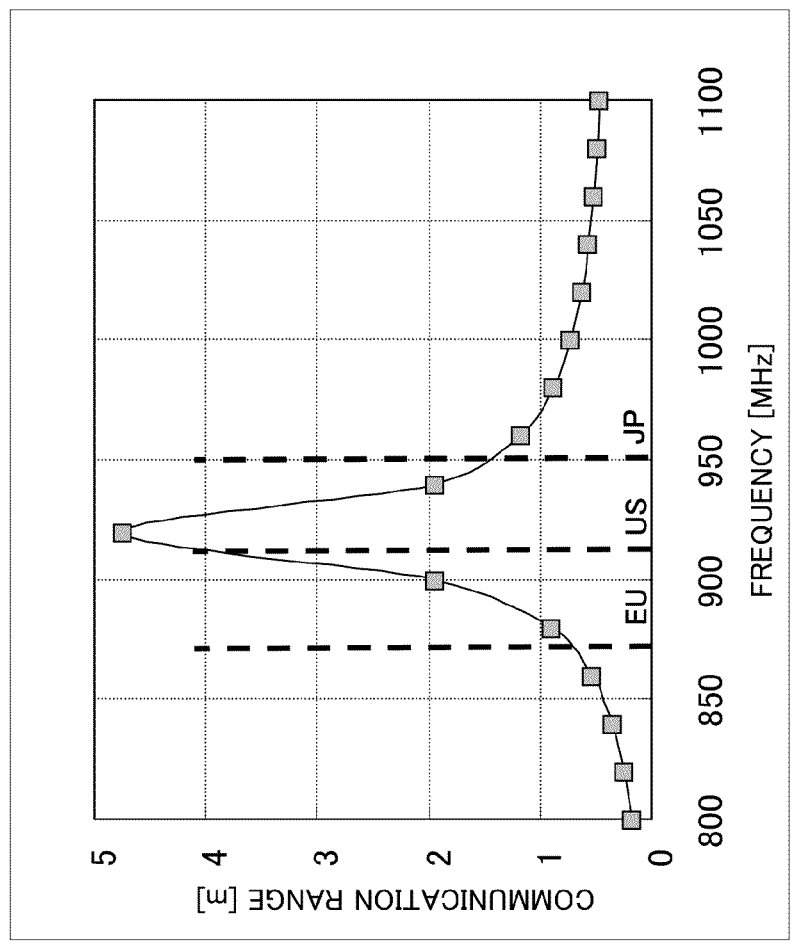
FIG. 15 is a graph illustrating one example of the communication range characteristic of a conventional radio frequency tag.
Figure 16:
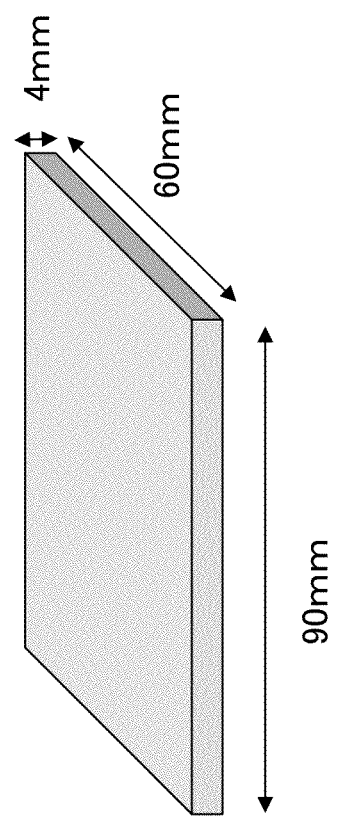
FIG. 16 is schematic perspective view illustrating the outer appearance of the conventional radio frequency tag.

In addition, as schematically depicted in FIG. 14, it is possible to improve the environmental resistance by reinforcing or protecting the antenna pattern 2 by covering the two sides of the antenna pattern sheet 20 with an urethane resin sheet (sheet-like resin material) 23, for example.

Of course, it is also possible to form the antenna pattern 2 (the resonator patterns 21 and 22) by providing (e.g., attaching) a copper plate on one side of the spacer 1 and forming the patterns by wet etching copper plate.

(B) Others

Note that the antenna pattern 2 may include three or more resonator patterns although the antenna pattern 2 is formed from two resonator patterns 21 and 22 in the example described above. For example, as described later with reference to FIG. 35 to FIG. 38, the configuration is possible in which another resonator pattern 24 is provided, in addition to the resonator patterns 21 and 22, on the opposite face of the second resonator pattern 22 having the first resonator pattern 21 interposed therebetween such that three resonance points are provided, for example. That is, it is apparent that the number of resonator patterns is not limited to two.

In addition, the shape (surface pattern) of each of the resonator patterns 21 and 22 is not limited to rectangles. For example, as described later with reference to FIG. 39, it is possible to form the resonator patterns 21 and 22 into a wedge-shape, and to arrange them adjacent to each other in a staggered configuration. In this case, the width of the antenna pattern 2 (the Y-axis direction in FIG. 1) can be further reduced.

(C) First Variant

Figure 17:
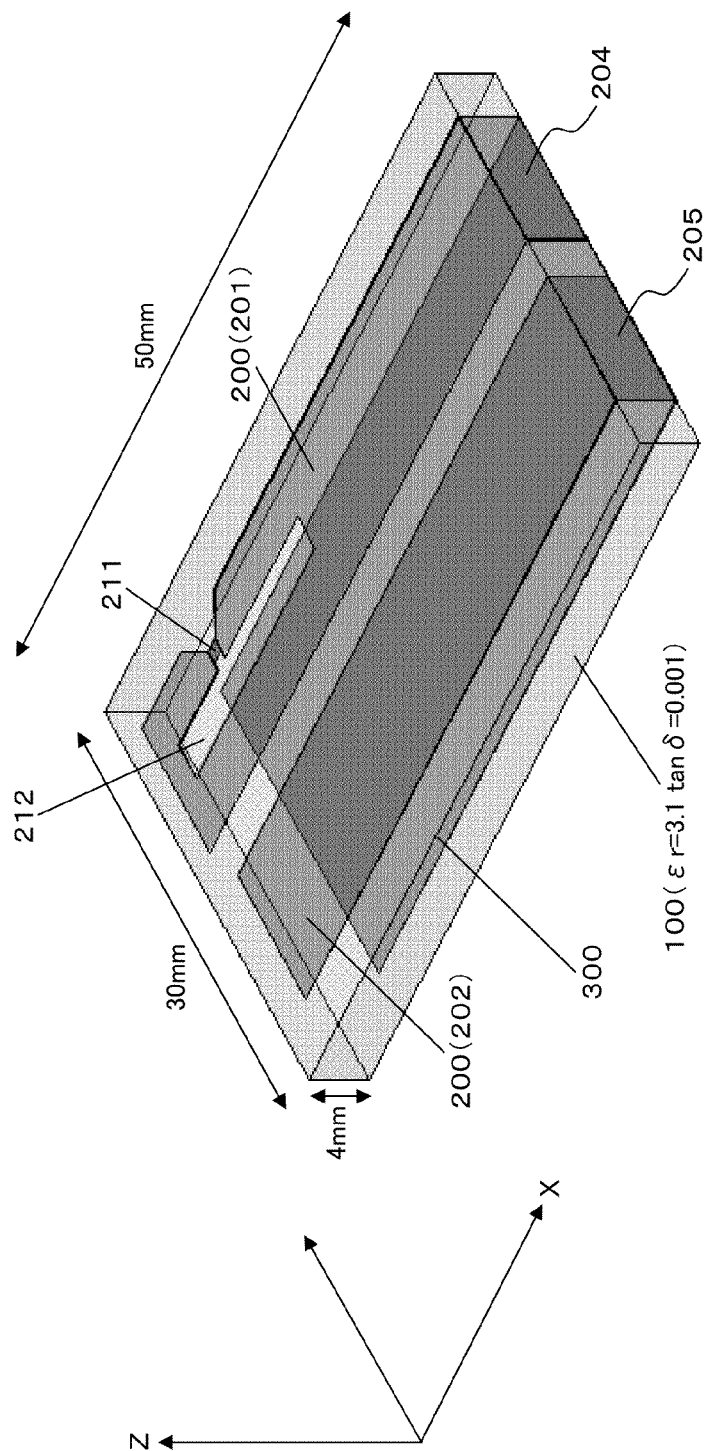
FIG. 17 is a schematic perspective view partially seeing through a radio frequency tag according to a variant.

FIG. 17 is a schematic perspective view partially seeing through a radio frequency tag according to a first variant. The radio frequency tag depicted in FIG. 17 includes, for example, an antenna pattern 200 (201, 202) formed on one face (one face in the Z-axis direction in FIG. 17) of a dielectric spacer (hereinafter, also referred to as "dielectric block") 100. In addition, a conductor pattern 300 is formed on the other face of the dielectric block 100.

A dielectric substrate or a resin having a relative permittivity ∈r of about 2-4 may be used for the dielectric spacer 100. Examples thereof include a PP (polypropylene), an ABS (acrylonitrile butadiene styrene), a PC (polycarbonate), a PBT (polybutylene terephthalate), a PPS (polyphenylene sulfide), a PEEK (polyether ether ketone) or the like, as non-limiting examples.

The size of the dielectric block 100 is a length of 50 mm, a width of 30 mm, and a thickness (t) of 4 mm, for example, for the UHF band (860-960 MHz), ∈r=3.1, the dielectric dissipation factor tan δ=0.001, although the size varies depending on the frequencies and the relative permittivity ∈r that are employed. That is, the length in the X-axis direction is about the half of the length of the radio frequency tag illustrated in FIG. 1.

The antenna pattern 200 includes a first band-shaped (rectangular) conductor pattern 201 that extends in longitudinal direction of the dielectric block 100 (the X-axis direction in FIG. 17) and a second band-shaped (rectangular) conductor pattern 202 that is located adjacent to the first conductor pattern 201 in the Y-axis direction, for example.

The conductor patterns 201 and 202 are preferably arranged so that electromagnetic induction coupling is facilitated. As one example, in FIG. 17, the conductor patterns 201 and 202 are arranged on the dielectric block 100 in parallel with each other spaced apart with a spacing of 3 mm, for example, in the Y-axis direction in FIG. 17. The length in the X-axis direction L1 of the first conductor pattern 201 is 45 mm, for example, and the length in the X-axis direction L2 of the second conductor pattern 202 is 43 mm, for example.

In this example, the first conductor pattern 201 functions as a resonator pattern having a resonance frequency f1, and the second conductor pattern 202 functions as a resonator pattern having a resonance frequency f2 that is greater than the resonance frequency f1. In addition, the length (width) in the Y-axis direction of the antenna pattern 200 is 27 mm including the above-identified spacing of 3 mm.

The conductor pattern 300 has an area that is greater than the area of the first resonator pattern 201 and the second resonator pattern 202 and is smaller than the area of the dielectric block 100 on the XY plane area, for example. For example, the conductor pattern 300 has the size that covers the entire antenna pattern 200, and has an area of 45 mm×27 mm, for example, and functions as a resonator pattern that is common to the first resonator pattern 201 and the second resonator pattern 202. Note that the first resonator pattern 201, the second resonator pattern 202, and the resonator pattern 300 may be referred to as the first resonator 201, the second resonator 202, and the common resonator 300, respectively.

For this, the first and second resonators 201 and 202 are electrically connected to the common resonator 300 via conductor patterns (side conductors) 204 and 205, respectively, which are provided on one side face of the dielectric block 100. That is, the common resonator (conductor pattern) 300, and the first and second resonators 201 and 202 are electrically connected via a path that runs one side face of the dielectric block 100.

In other words, the two band-shaped conductor patterns 201 and 202 (including the side conductors 204 and 205) extend from the common resonator 300 on the other face of the dielectric block 100 (back face) via one side face of the dielectric block 100 in the longitudinal direction to the one side (front face). It is understood that the conductor pattern exists on the dielectric block 100 in a loop (half loop) shape, except for one side face of the dielectric block 100 in the longitudinal direction, when being viewed this radio frequency tag from the side face (Y-axis direction).

Figure 23:
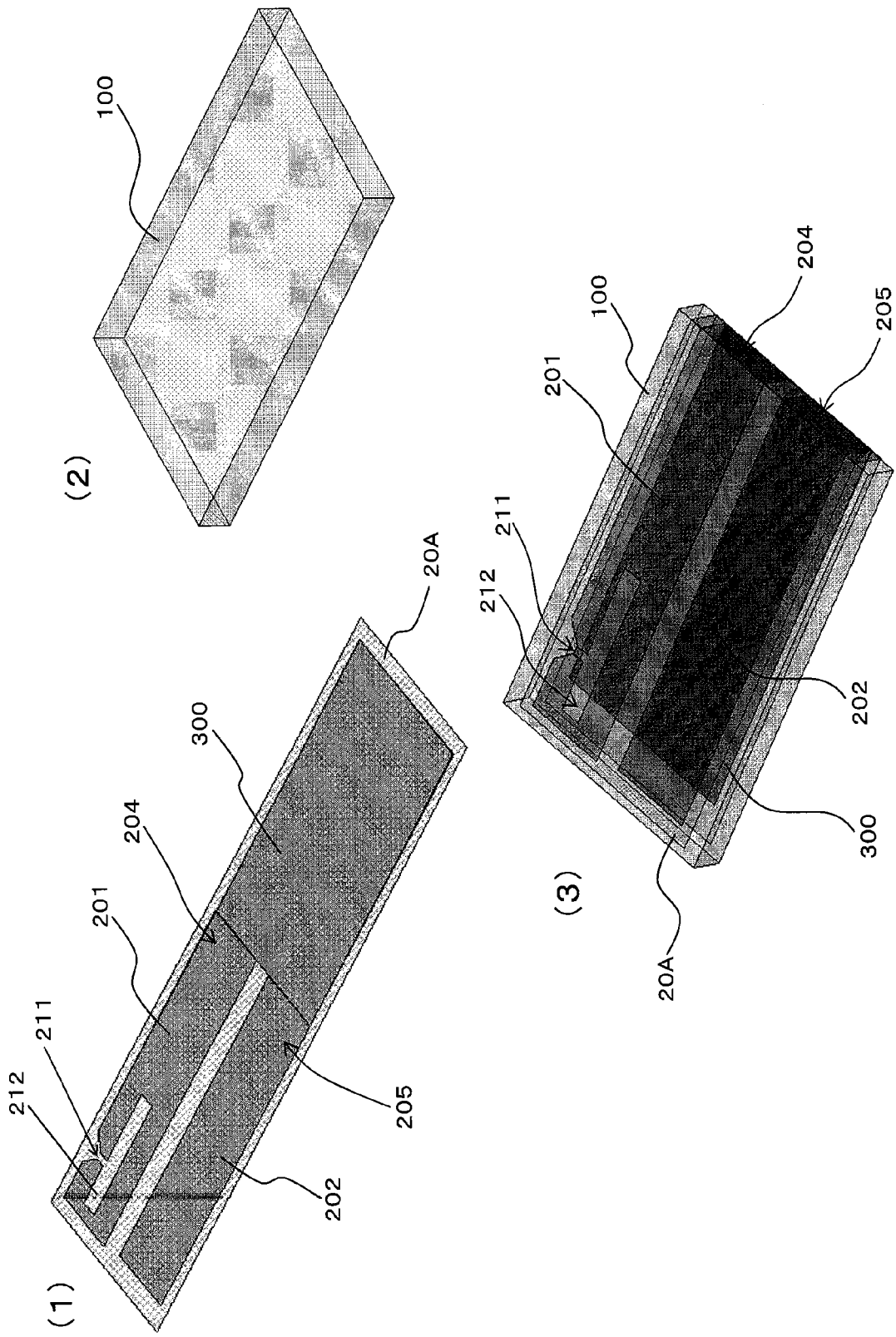
FIG. 23 is a diagram illustrating one example of a method of manufacturing the radio frequency tag depicted in FIG. 17.
Figure 24:
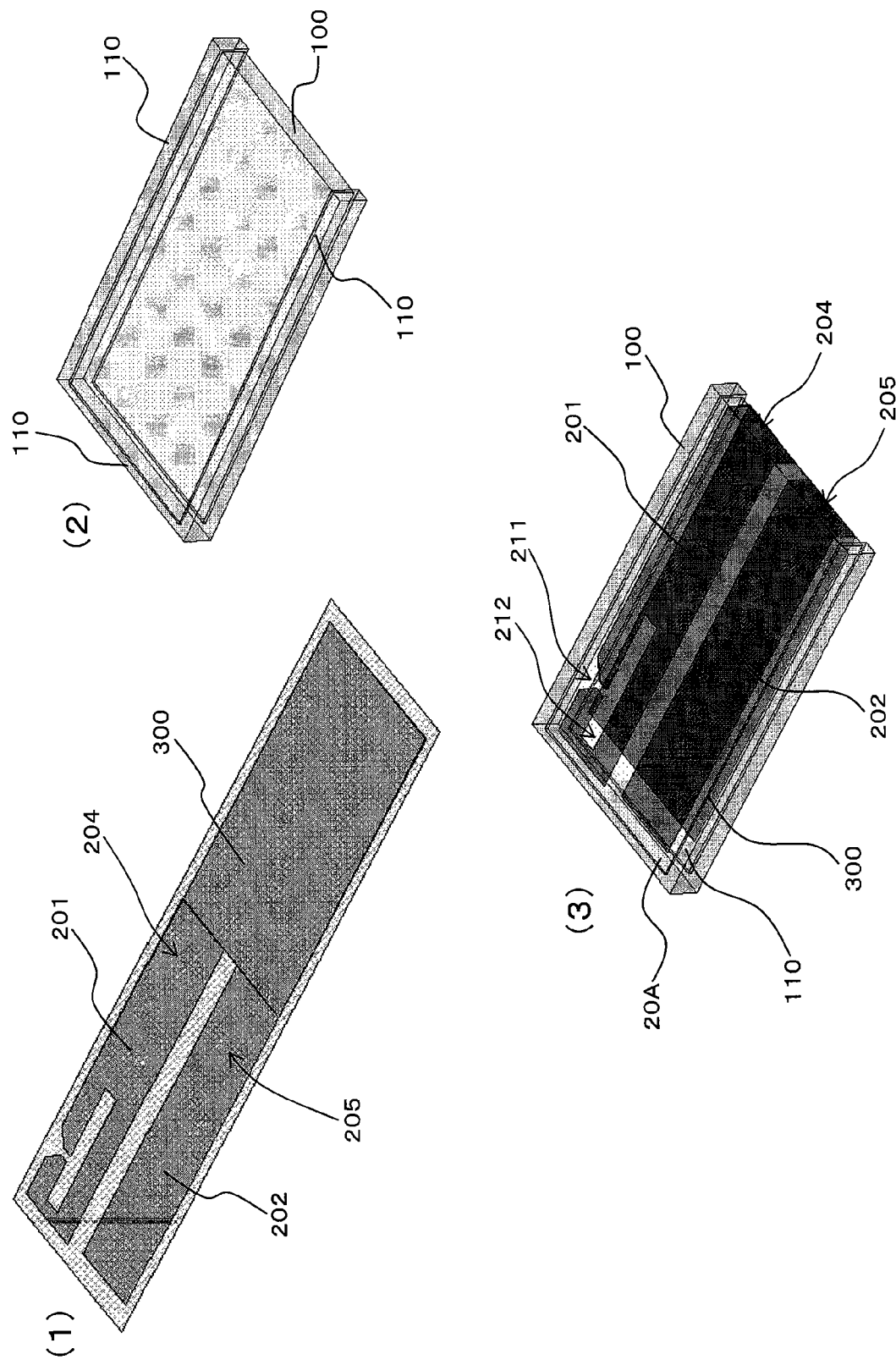
FIG. 24 is a diagram illustrating another example of a method of manufacturing the radio frequency tag depicted in FIG. 17.

Thus, the conductor patterns 201-205 formed on the dielectric block 100 have the shapes as depicted in FIG. 23 and FIG. 24 (1) when they are expanded. Note that the side conductors 204 and 205 may be formed integrally with one or both of the resonator patterns 201 and 202, and the conductor pattern 300. In addition, the conductor patterns 201-205 can be formed by gold plating, or copper plating, or the like, for example. In addition, an electrically conductive tape (sheet-like member) made of copper, aluminum, or the like may be used for the side conductors 204 and 205, for example.

In this example, an impedance matching of the antenna pattern 200 in the radio frequency tag with an integrated circuit, such as an IC chip or an LSI (hereinafter, referred to as a "chip") used within the radio frequency tag. This chip may be represented with a parallel capacitance component Ccp and a parallel resistance component Rcp, as depicted in FIG. 6, for example. For example, Ccp is around 1 pF (picofarad), (for example, 1.4 pF), and Rcp is between 200Ω and 20000Ω (for example, 400Ω).

Thus, the antenna equivalent circuit that matches with this chip may be represented with a parallel inductance component Lap that resonates with the capacitance component Ccp and a parallel resistance Rap that is comparable with the resistance component Rcp, as depicted FIG. 6. That is, the antenna pattern 200 may require having the inductance component Lap and the radiation resistance component Rap.

For this purpose, a chip connecting section (feeding point) 211 to which the chip is connected is provided in the first resonator pattern 201. In addition, a slit section 212 that has long sides (length S2) in the X-axis direction is provided in this resonator pattern 201. The slit section 212 functions as an inductance section having an inductance length S2.

Figure 22:
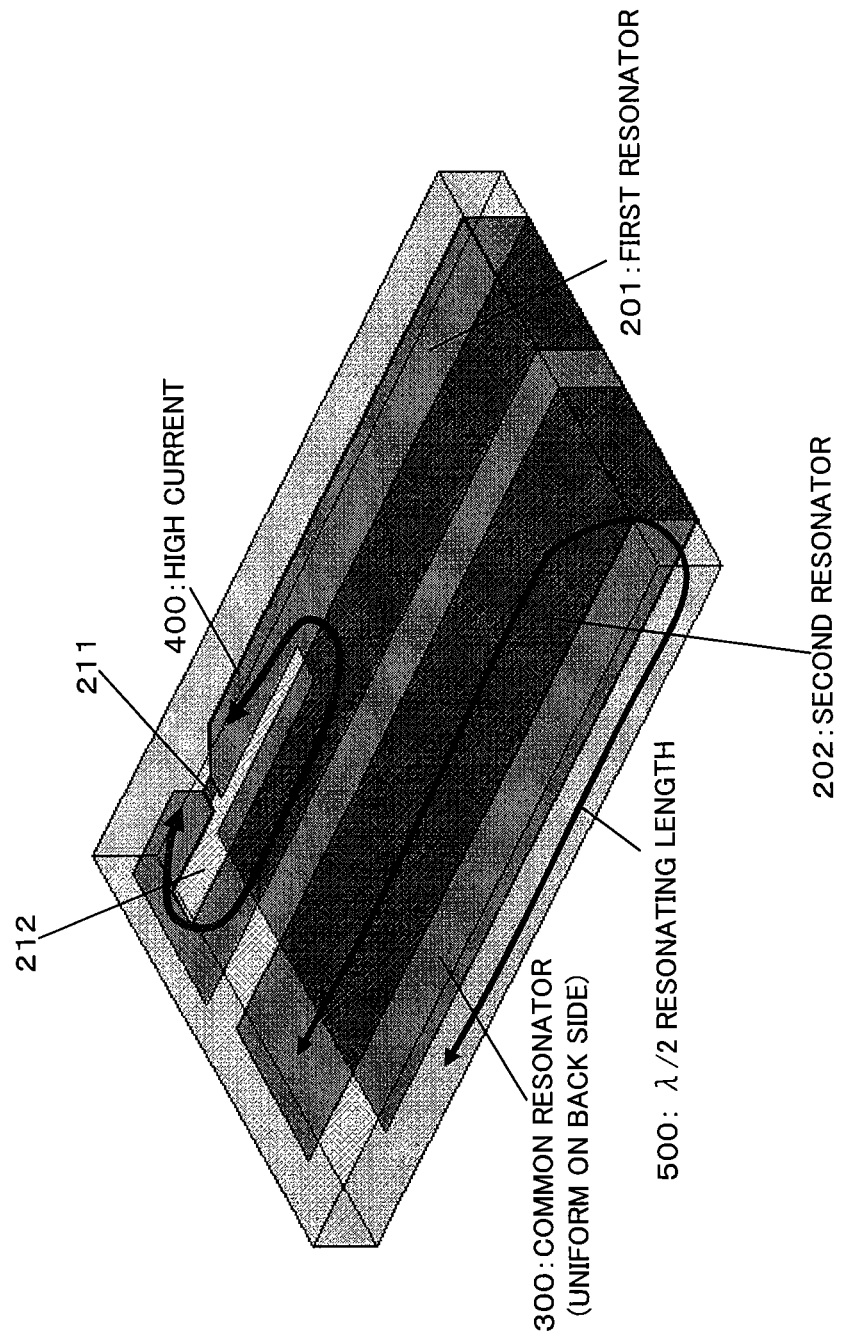
FIG. 22 is a perspective view illustrating the operation of the radio frequency tag depicted in FIG. 17.

The size of the inductance section (slit section) 212 may be set to an appropriate size for achieving impedance matching with the chip. For example, as illustrated in FIG. 22, the lengths of the second (first) resonator 202 (201), the side conductor 205 (204), and the common resonator 300 are preferably set to the half wave of the operating frequency (λ/2) (the electrical length indicated by Arrow 500). The resonating length of λ/2 is dependent on the operating frequency f and the relative permittivity ∈r.

In this example, the inductance section 212 also plays the following three roles:

(1) The inductance for matching with the chip (canceling the capacitance component of the chip)

(2) The direct feed to the first resonator pattern 21

(3) The electromagnetic coupling feed to the second resonator pattern 22

If power is provided from the feeding point 212 to the first resonator pattern 201 as depicted in FIG. 22, for example, a large amount of current is flown into the inductance section 212 as indicated by an arrow 400 (the current distribution of the inductance section 212 becomes dense). Thus, this part (the inductance section 212) functions as a power source for the second resonator pattern 202. That is, although not being directly coupled, the inductance section 212 and the second resonator pattern 202 electromagnetic induction couple with each other and thus provide power via the inductance section 212 by means of electromagnetically coupling.

Thus, even when the resonator patterns 201 and 202 are arranged in proximity in this manner, by utilizing the inductance section 212, the first resonator pattern 201 can be regarded as power source to the second resonator pattern 202. Accordingly, when the resonator patterns 201 and 202 are long distance apart, the strength of electromagnetic coupling between them is reduced, and this leads to insufficient power feed to the second resonator pattern 202, which hinders radio waves to radiate.

That is, it is possible to reduce the entire size of the antenna pattern 200 by placing the resonator patterns 201 and 202 in such a short distance that the inductance section 212 is regarded as a power source to the second resonator pattern 202, also in this example.

Thus, the positions in which the inductance section 212 (slit section) is provided is preferably the position in which the direct feed to the first resonator pattern 201 and electromagnetic coupling feed to the second resonator pattern 202 are adequately obtained. The position is set at offset from the center in the length direction (X-axis direction) of the first resonator pattern 201, is preferably set at the proximity of the edge as depicted in FIG. 1, for example.

The results of calculation (simulation) of a characteristic of the first variant described above performed using a three-dimensional electromagnetic field simulator will be explained. Note that, in this simulation, the size of the inductance section 212 are assumed to be as follows: the inductance length in the X-axis direction S2=18 mm and the inductance width in the Y-axis direction=2.5 mm.

Figure 21:
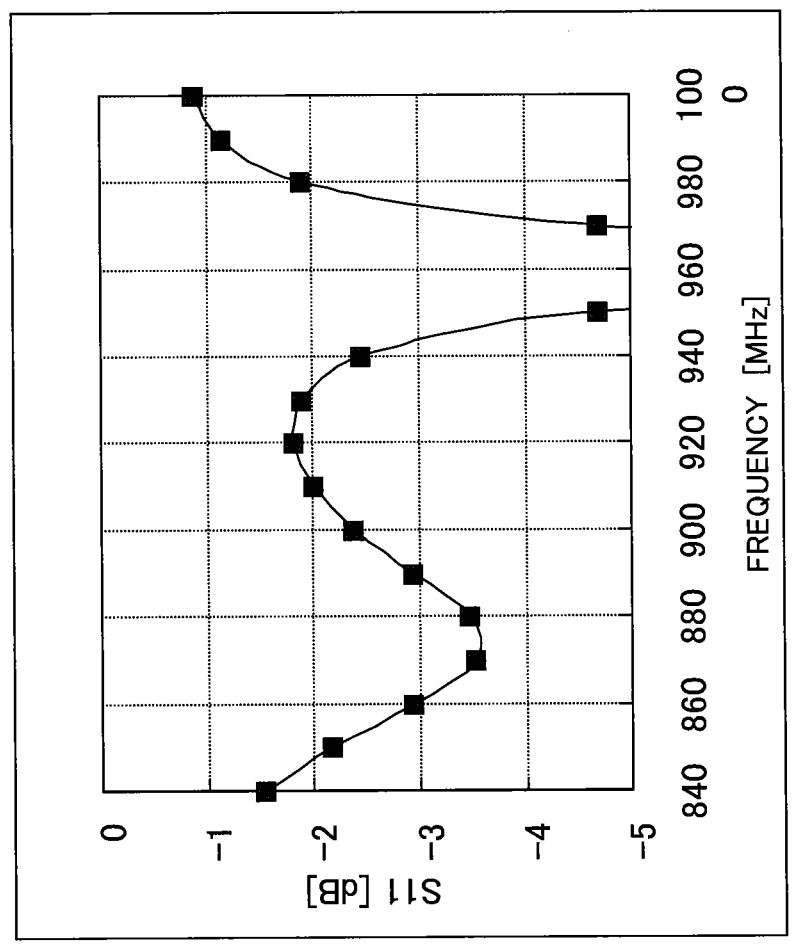
FIG. 21 is a graph illustrating one example of the reflection characteristic of the radio frequency tag depicted in FIG. 17.

Firstly, the reflection characteristics (S11) of the chip and the antenna pattern 200 are depicted in FIG. 21. S11 on the vertical axis indicates higher reflection amount as it is closer to zero whereas better matching as the value is smaller (minus values), that is, the input power of the antenna pattern 200 is transmitted to the chip connecting section 211 (i.e., the chip) more easily.

In this calculation example, it is assumed that the capacitance component of the chip Ccp is 1.4 pF and the resistance component Rcp is 400. The degree of matching varies with the inductance length S2, and it is understood that there are two resonance points at different frequencies f1 and f2.

The values of the resonance frequencies f1 and f2 may be controlled (adjusted) using the length L1 of the resonator pattern 201 and the length L2 of the resonator pattern 202, respectively. For example, the resonance frequency f1 moves (shifts) towards a lower frequency side when the length L1 is increased, whereas the resonance frequency f2 moves (shifts) towards a higher frequency side when the length L2 is reduced. That is, it is possible to adjust the pass bandwidth of the radio frequency tag.

Figure 20:
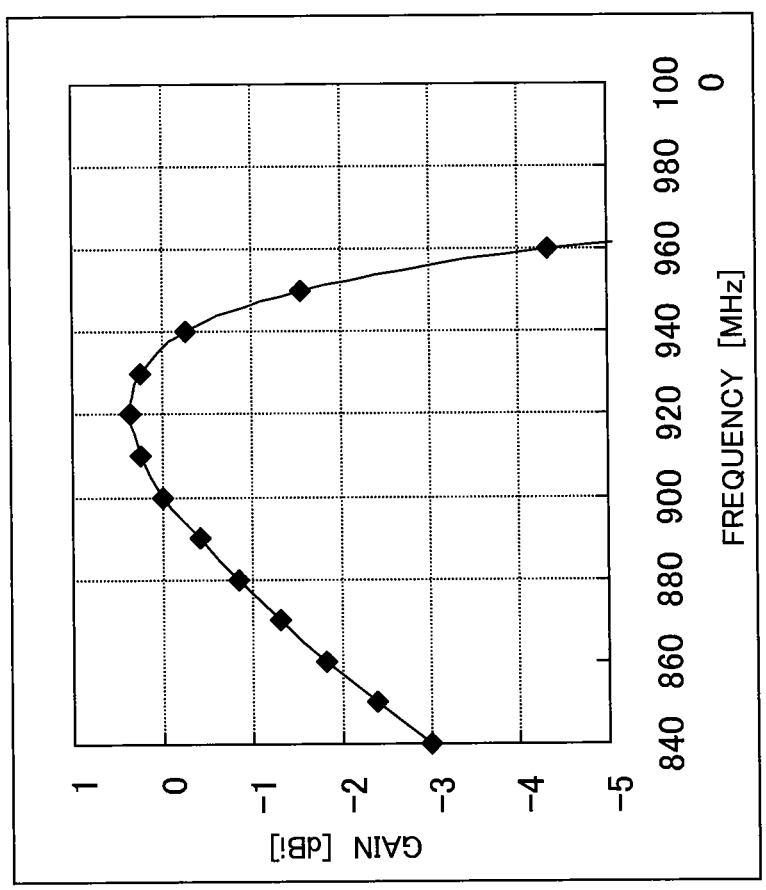
FIG. 20 is a graph illustrating one example of the gain characteristic of the radio frequency tag depicted in FIG. 17.

The antenna gain can be set within a range that is acceptable in practical use for the frequency at the frequency band including the operating frequencies used in Europe (EU), the United States (US), and Japan (JP), for example, EU=868 MHz, US=915 MHz, JP=953 MHz, as illustrated in FIG. 20.

Figure 19:
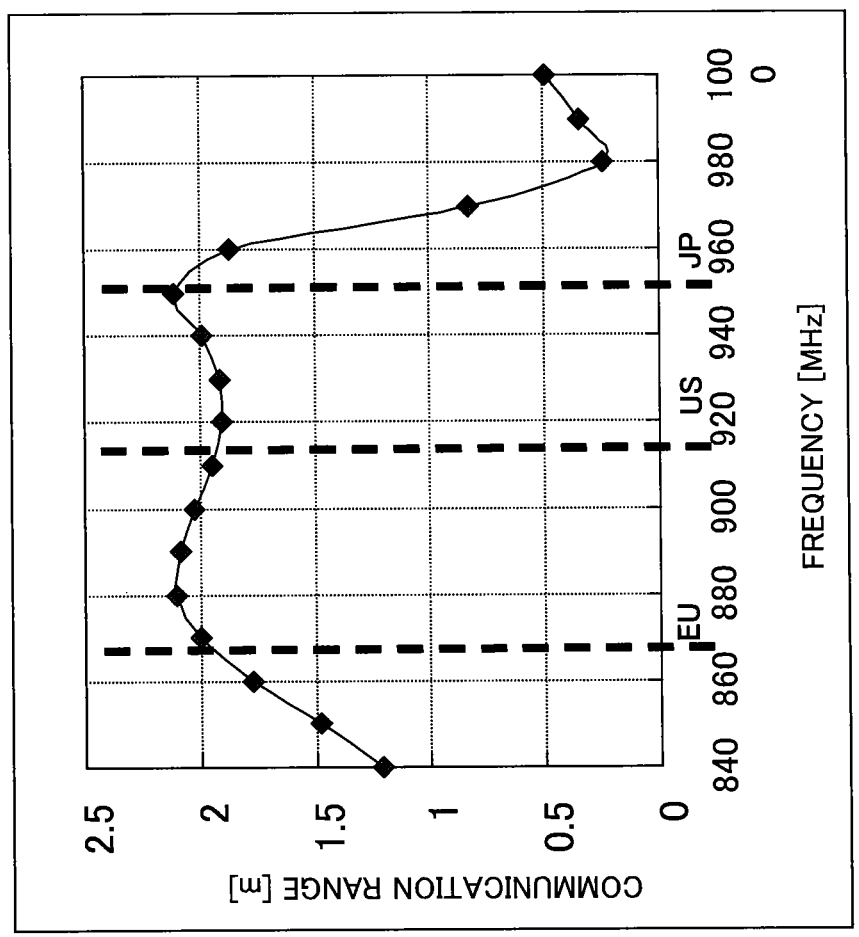
FIG. 19 is a graph illustrating one example of the communication range characteristic of the radio frequency tag depicted in FIG. 17.

The communication range (read range) characteristic is calculated considering all of the above factors. One example is illustrated in FIG. 19. As illustrated in FIG. 19, a communication range characteristic that is acceptable in practical use can be obtained at a frequency band including the operating frequencies used in EU, US, and JP. Note that the communication range refers to the communication range in the Z-axis direction in FIG. 17. Calculation conditions are as follows: an antenna of an RW apparatus (RW antenna) is a circularly polarized wave antenna of 9 dBi, the power of the RW antenna is 27 dBm (0.5 W), and the operating power of a chip is −9 dBm.

Figure 18:
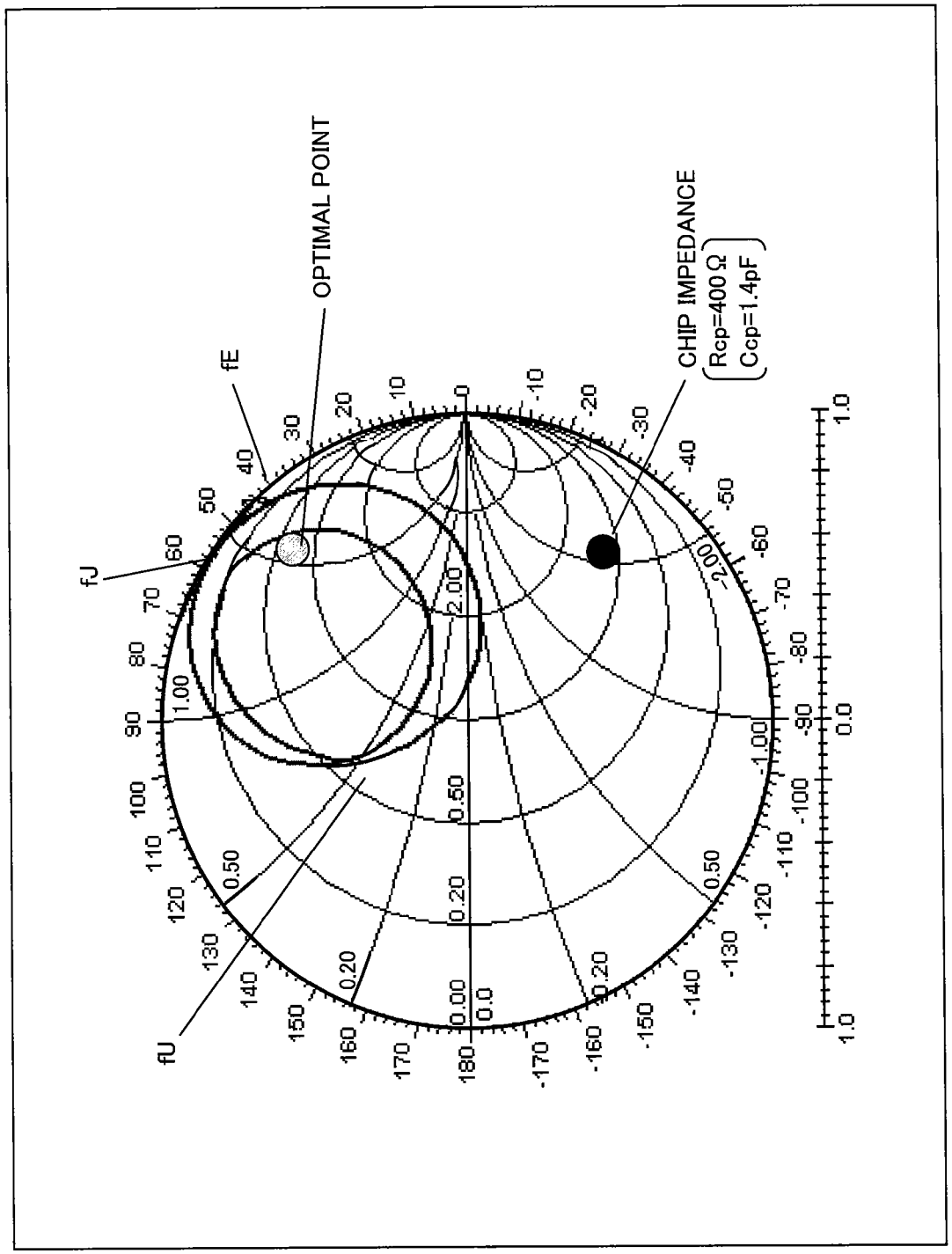
FIG. 18 is a Smith chart illustrating the chip impedance and the antenna impedance of the radio frequency tag depicted in FIG. 17.

Next, the locus of the antenna impedance on a Smith chart when the operating frequency is varied from 700 MHz to 1200 MHz is illustrated in FIG. 18. The optimal point of the antenna impedance is the point that is symmetrical with respect to the chip impedance (i.e., a complex conjugate number of the chip impedance) on the Smith chart. It is desirable that the locus of the antenna impedance becomes a small circle about this point. Since the impedance locus goes about the optimal point twice in FIG. 18, it is understood that there are two resonance points. Note that fU, fE, and fJ indicate the operating frequencies in the United States (US), in Europe (EU), and in Japan (JP), respectively, in FIG. 18.

As described above, according to the radio frequency tag of this variant, in addition to achieving the same advantageous effects as the above-described embodiment, it is possible to further reduce the size of the broad band radio frequency tag that can practically cover the operating frequencies used in EU, US, and JP without a problem since the length in the X-axis direction can be reduced to about the half.

That is, metal-resistant tags that have communication range characteristic that is sufficiently practical in any of the operating frequency bands in EU, US, and JP. Thus, it is possible to assure a reliable communication range characteristic when the tags are attached on a curved surface or there is an error of the relative permittivity or the thickness of the dielectric block 100. In addition, radio frequency tags that are quite compact in size can be provided since half-wave ($\lambda/2$) resonance is obtained on two faces of the dielectric block 100.

(Manufacturing Method)

The radio frequency tag of the above-described first variant can be manufactured, as illustrated in FIG. 23, for example. The conductor patterns 201, 202, and 300 are formed by applying (e.g., printing) an electrically conductive material, such as copper (Cu), silver (Ag), aluminum (Al), on the sheet-like member (conductor pattern sheet) 20A, such as a film or a sheet of paper.

The sheet-like member 20A has a size that can cover three faces among four faces of the dielectric block 100 defining the surrounding edge length in the longitudinal direction (X-axis direction) of the dielectric block 100, except for the side face that faces the longitudinal direction, for example.

A conductor pattern 201 (the chip connecting section 211 and the inductance section 212) and a conductor pattern 202 are formed in the regions corresponding to the facing one side among the three faces of the sheet-like member 20A and the side face. On the other hand, the conductor pattern 300 that eclectically communicates with the resonators 201 and 202 is provided on the region corresponding to the other face of the dielectric block 100 of the sheet-like member 20A (rest face among the three faces).

The sheet-like member 20A having the conductor patterns 201, 202, and 300 formed thereon is wrapped around and attached to the dielectric block 100, made of plastics, for example, illustrated in FIG. 23 (2). In this case, parts of the conductor patterns 201 and 202 are aligned such that they are located on the respective side faces of the dielectric block 100. This allows the parts of the conductor patterns 201 and 202 to function as the side conductor 204 and 205, as illustrated in FIG. 23 (3), and thus it is possible to manufacture the radio frequency tag of the above-described first variant.

Note that a guide (alignment member) 110 may be provided in the dielectric block 100, as illustrated in FIG. 24 (2). The guide 110 facilitates alignment (prevents misalignment) of the conductor pattern sheet 20A to the dielectric block 100 upon wrapping. The guide 110 may be formed by cutting the surface of the dielectric block 100 according to the size of the conductor pattern sheet 20A, or may be formed by providing an element that functions as the guide 110 on the periphery of the dielectric block 100.

The manufacturing method as illustrated in FIG. 23 or FIG. 24 can manufacture radio frequency tags of the first variant more easily, and allow mass production of low-cost radio frequency tags in shorter time.

Figure 25:
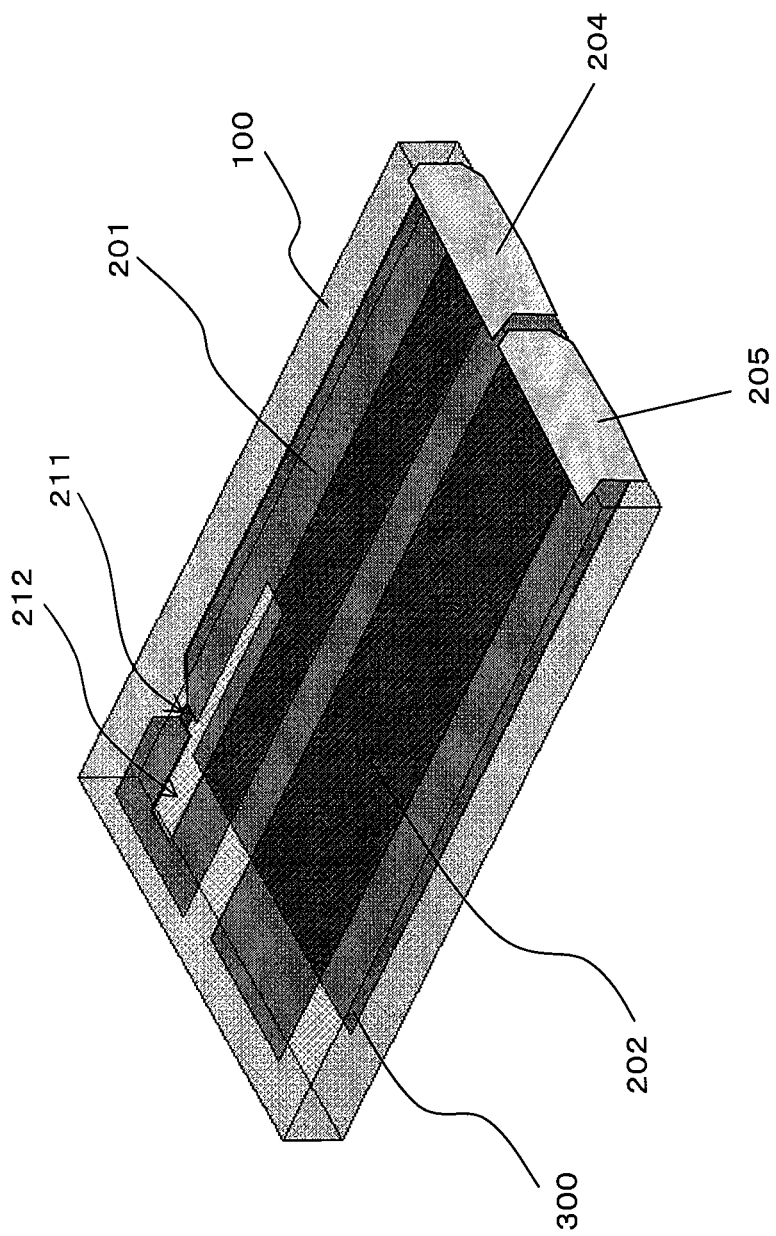
FIG. 25 is a schematic perspective view partially seeing through a radio frequency tag according to a variant of the radio frequency tag depicted in FIG. 17.
Figure 27:
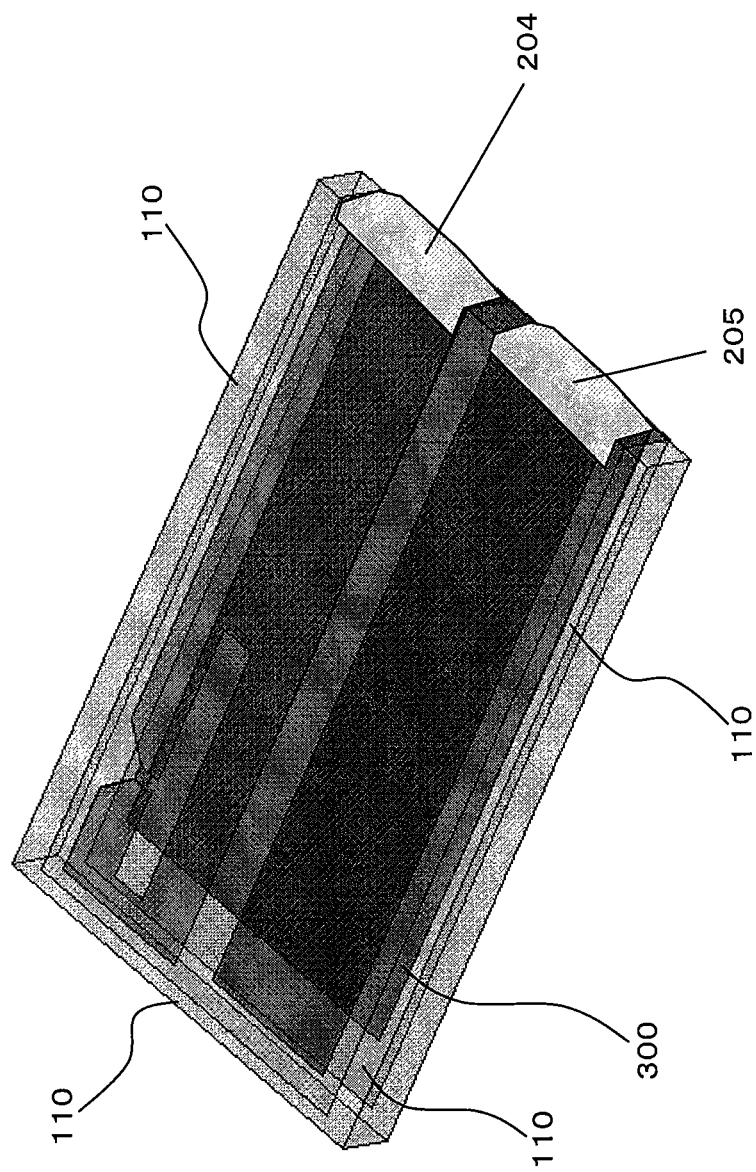
FIG. 27 is a schematic perspective view partially seeing through a radio frequency tag according to a variant of the radio frequency tag depicted in FIG. 17.

It is also possible to form one or more (including all) of the conductor patterns 201, 202, 204, 205, and 300 by providing (e.g., attaching) a copper plate on two sizes and one of the side faces of the dielectric block 100 and forming the patterns by wet etching copper plate. In addition, one or both of the side conductors 204 and 205 may electrically connect to the conductor patterns 201 (204) and 202 (205), with metal plating, or an electrically conductive tape, as illustrated in FIG. 25 or FIG. 27.

Figure 26:
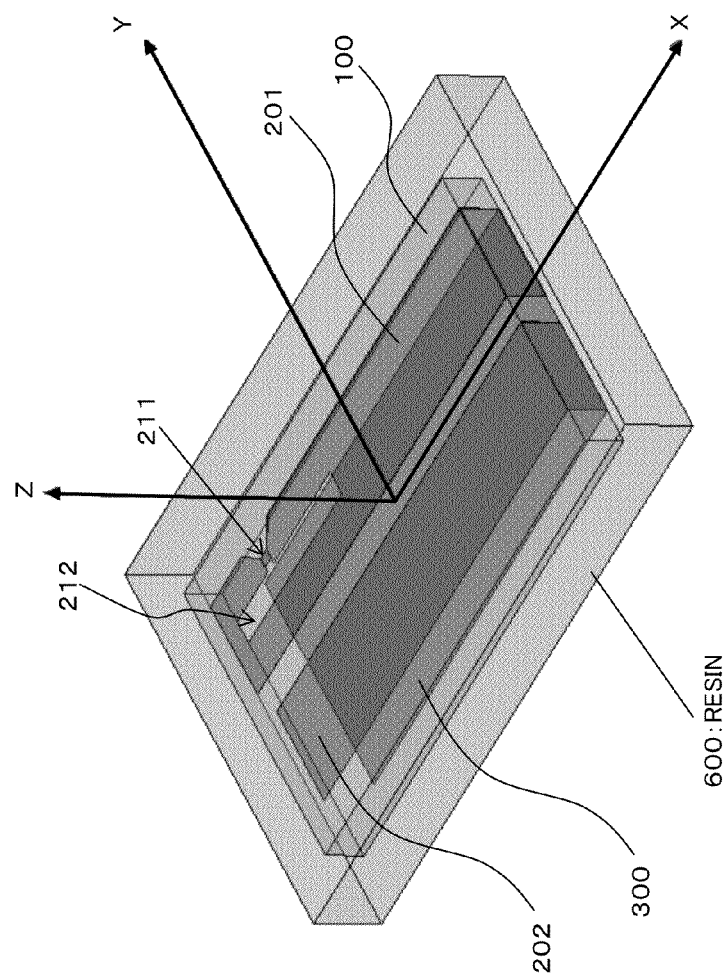
FIG. 26 is a schematic perspective view partially seeing through a radio frequency tag according to a variant of the radio frequency tag depicted in FIG. 17.

In addition, as illustrated in FIG. 26, the entire radio frequency tag (alternatively, a part of the radio frequency tag) (the resonators 201, 202, and 300) may be protected by covering with a resin 600. This can enhance the environmental resistance by preventing the damage to the radio frequency tag from external force or damage to an object to which the radio frequency tag is attached.

Note that a PP (polypropylene), an ABS (acrylonitrile butadiene styrene), a PC (polycarbonate), a PBT (polybutylene terephthalate), a PPS (polyphenylene sulfide), a PEEK (polyether ether ketone) may be used for the resin 600.

(D) Second Variant

Figure 28:
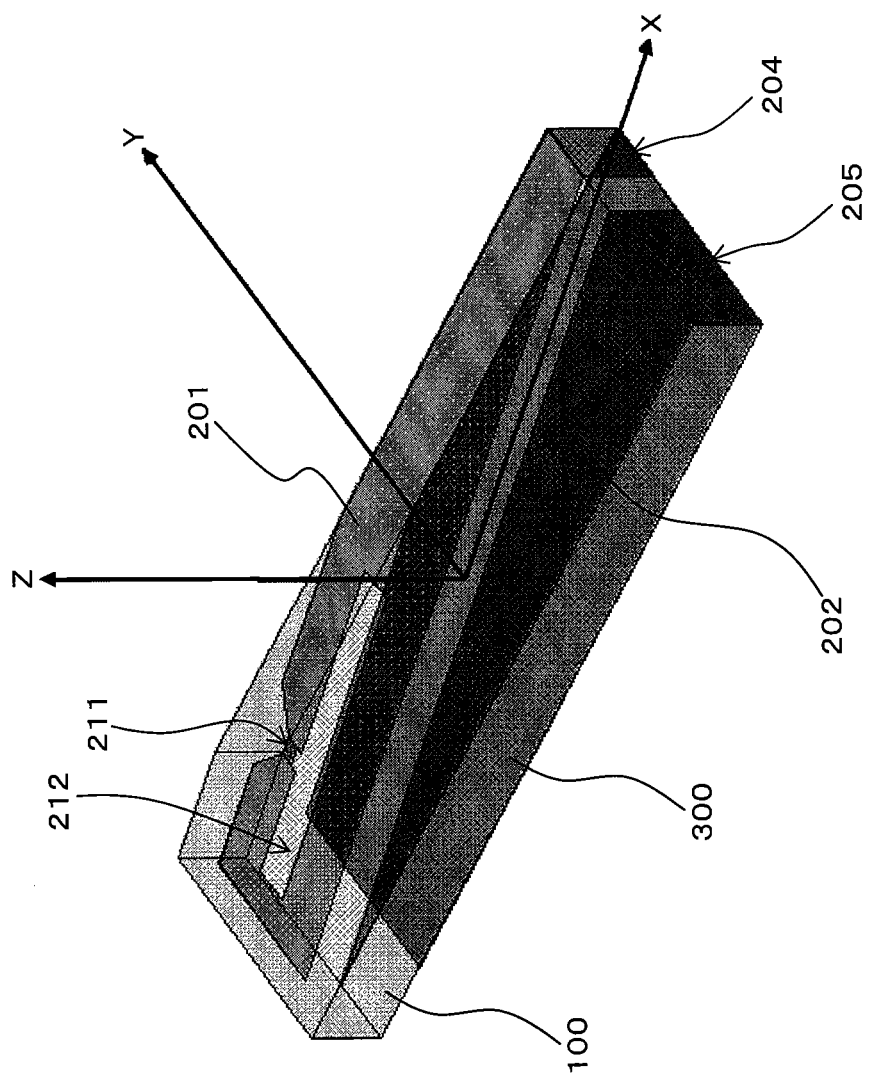
FIG. 28 is a schematic perspective view partially seeing through a radio frequency tag according to a variant of the radio frequency tag depicted in FIG. 17.

The resonator patterns 201, 202, and 300 described above may not necessarily have a rectangular shape on the front face of the dielectric block 100. For example, as illustrated in FIG. 28, when assuming the X-axis as the direction shifted from the direction that is parallel to the long sides of the dielectric block 100 by a certain angle, the first and second resonator patterns 201 and 202 may extend in the direction that is parallel to the X-axis direction.

This corresponds to wrapping the conductor pattern sheet 20A around the dielectric block 100 shifted in the direction that is not parallel to the long sides of the dielectric block 100 and cutting the excess conductor patterns 201, 202, and 300 in the manufacturing method described above with reference to FIG. 23 and FIG. 24. In the example in FIG. 28, the resonator pattern 202 has a triangular shape.

Figure 29:
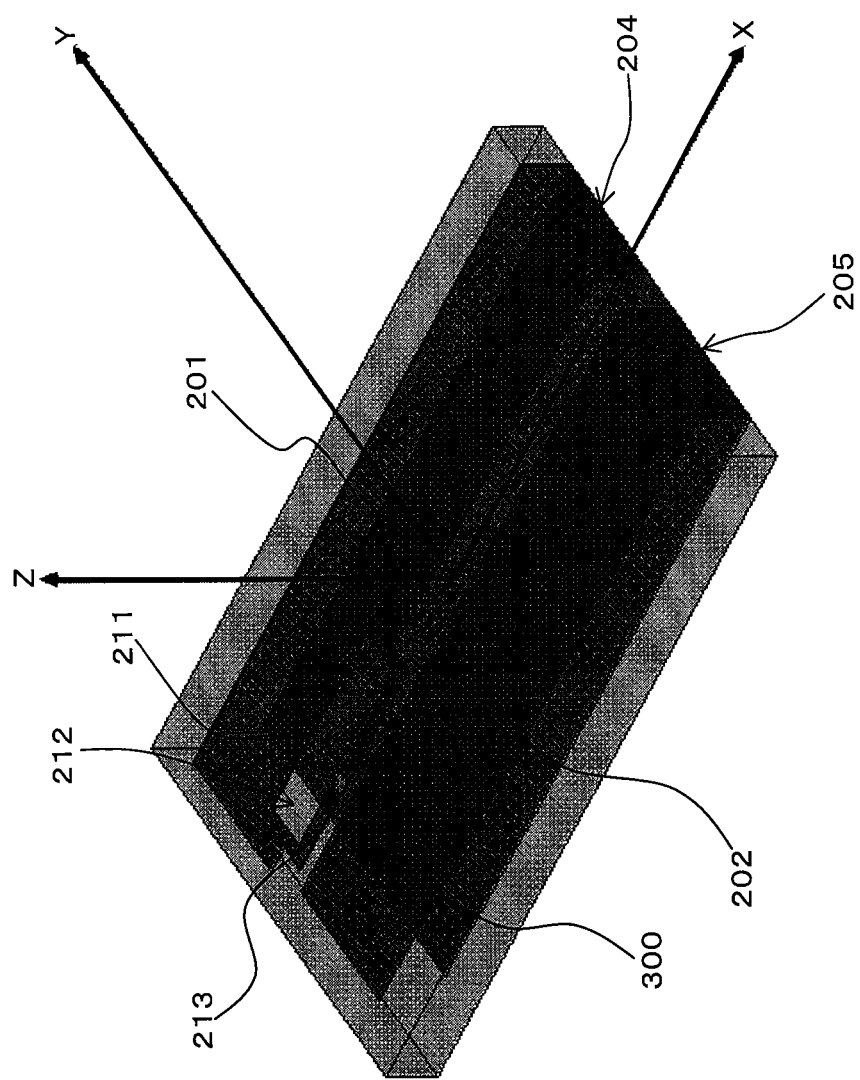
FIG. 29 is a schematic perspective view partially seeing through a radio frequency tag according to a variant of the radio frequency tag depicted in FIG. 17.
Figure 30:
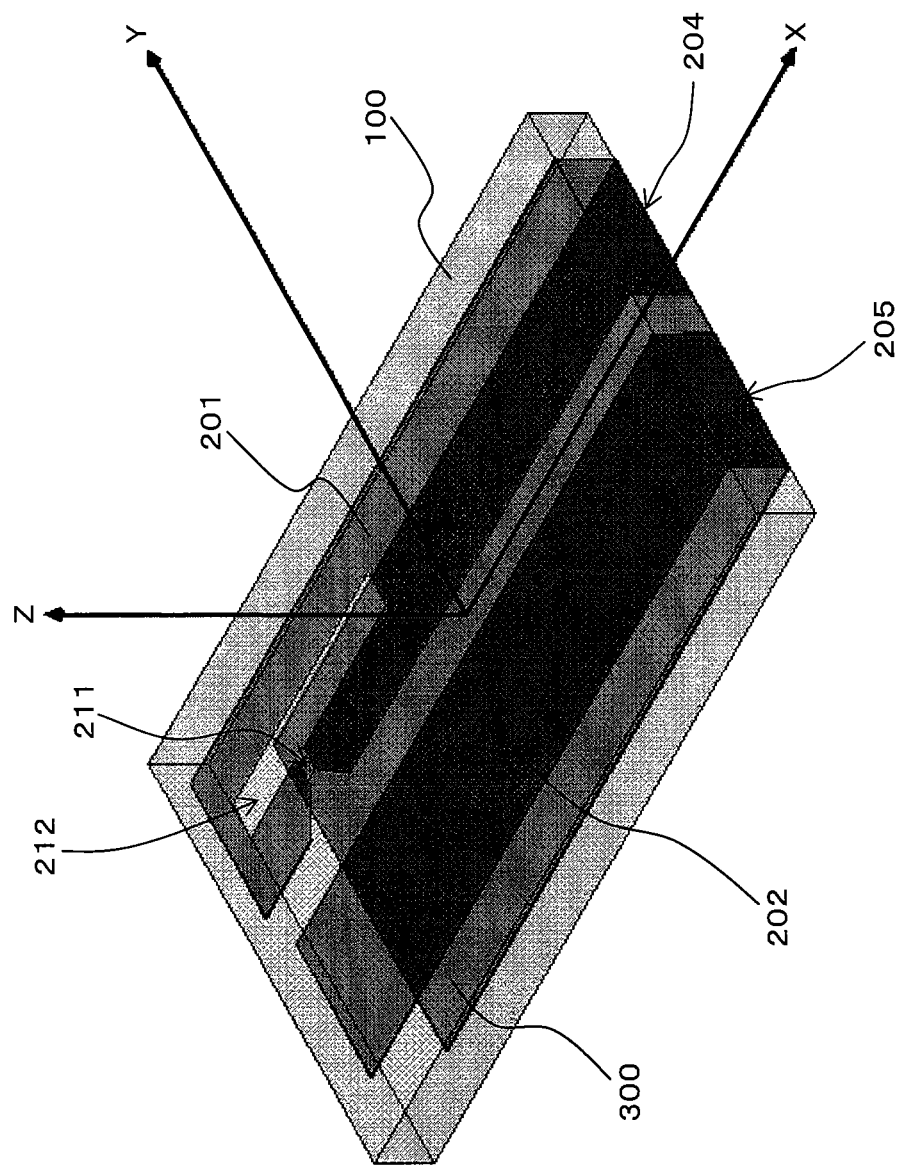
FIG. 30 is a schematic perspective view partially seeing through a radio frequency tag according to a variant of the radio frequency tag depicted in FIG. 17.

In addition, the shape of the inductance section 211 is not limited to the slit shape. For example, as illustrated in FIG. 29, the inductance configuration in which the feed line 213 may be extended to connect to the chip (the chip connecting section 211) is also possible. Furthermore, as illustrated in FIG. 29 and FIG. 30, the chip connecting section 211 is provided to the side closer to the second resonator 202. This provides an advantage in that the location to which the chip is mounted therefore has a certain thickness can be located on closer to the center of the radio frequency tag, and thus a well-balanced antenna roll can be obtained when manufacturing the roll, for example.

Figure 31:
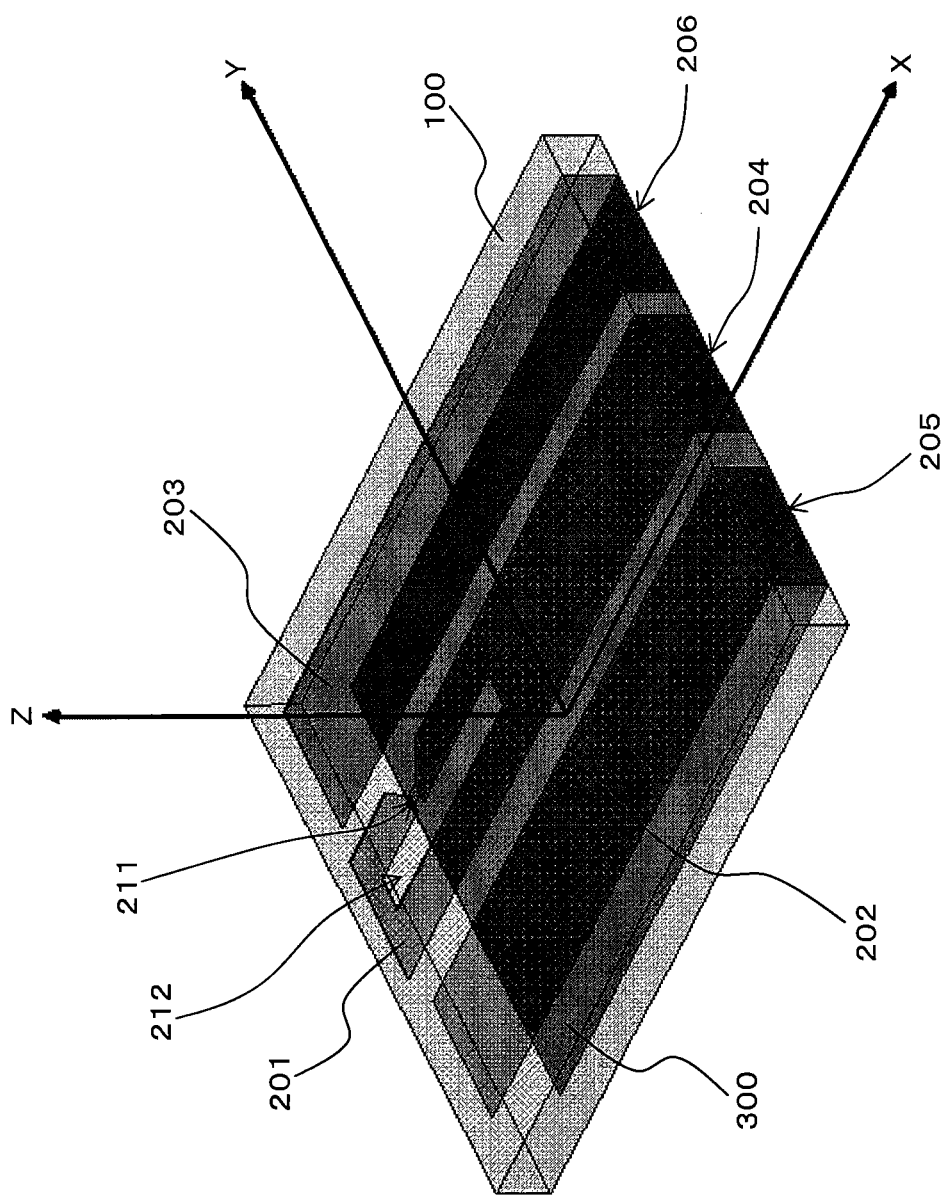
FIG. 31 is a schematic perspective view partially seeing through a radio frequency tag according to a variant of the radio frequency tag depicted in FIG. 17.

In addition, as illustrated in FIG. 31, a third resonator pattern (third resonator) 203 may be additionally provided on one side of the dielectric block 100, having the first resonator pattern 201 interposed on the center. In this case, the second and third resonators 202 and 203 are preferably provided at the locations that are symmetrical with respect to the first resonator pattern 201. The third resonator 203 is also electrically connected to the common resonator 300 provided on the other face of the dielectric block 100 via a side conductor 206.

That is, the three band-shaped conductor patterns 201, 202, and 203 (including the side conductors 204-206) extend from the common resonator 300 on the other face of the dielectric block 100 (back face) via one side face of the dielectric block 100 to the one side (front face).

Figure 32:
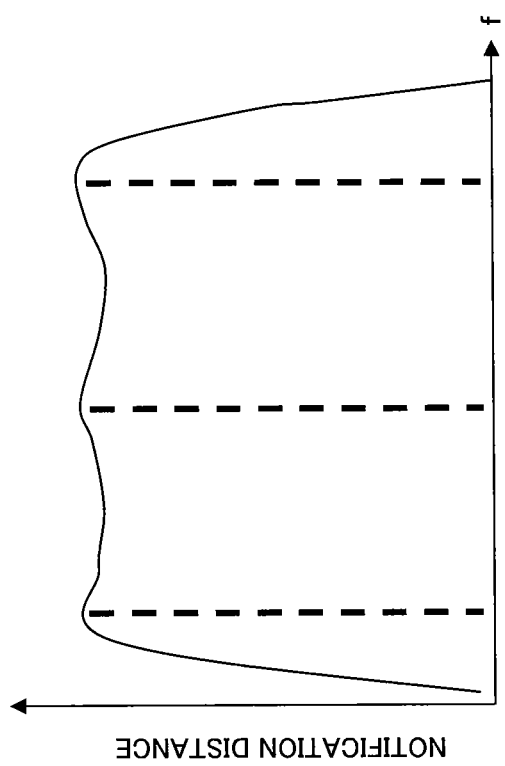
FIG. 32 is a diagram illustrating one example of frequencies versus the communication range characteristic of the radio frequency tag depicted in FIG. 31.

The radio frequency tag in this case can have three resonance frequencies f1, f2, and f3 according to the three resonators 201-203, as illustrated in the frequency versus communication range characteristic depicted in FIG. 32. Thus, it is possible to broaden the available frequency band.

Figure 33:
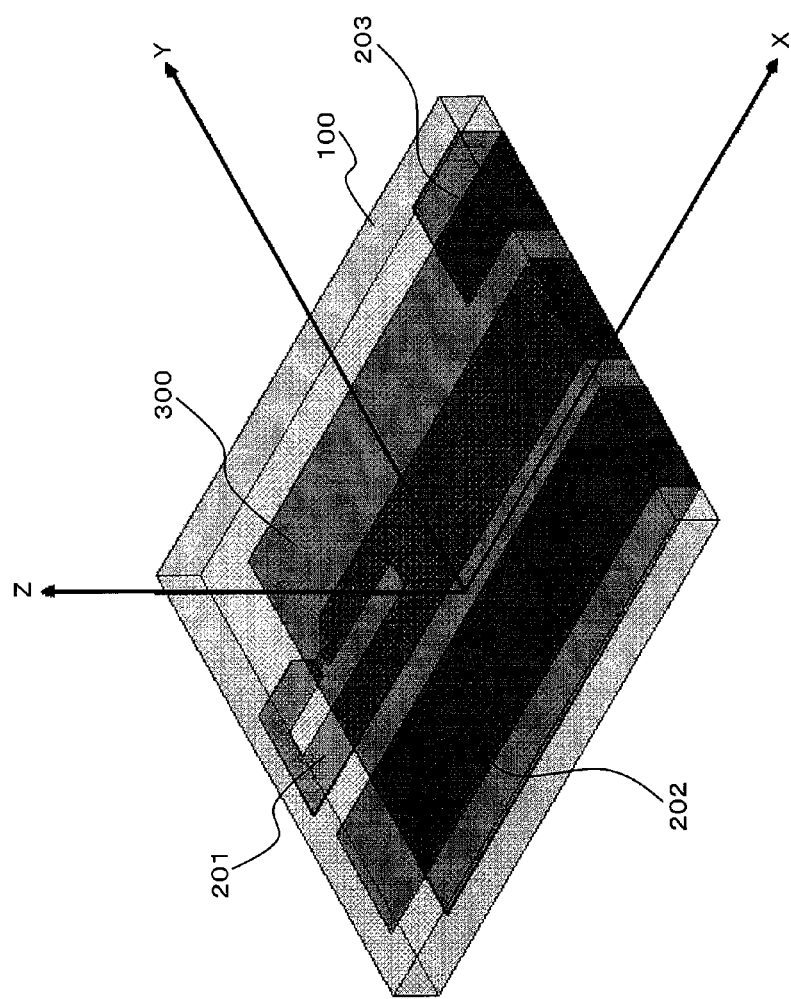
FIG. 33 is a schematic perspective view partially seeing through a radio frequency tag according to a variant of the radio frequency tag depicted in FIG. 17.
Figure 34:
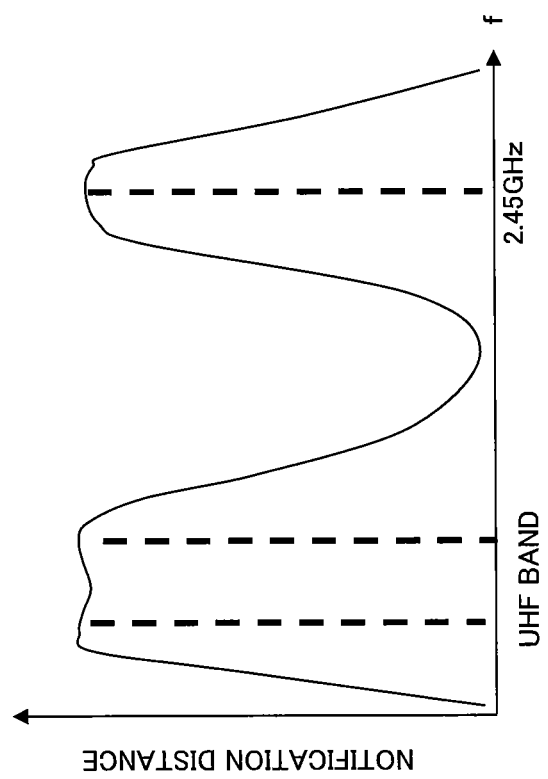
FIG. 34 is a diagram illustrating one example of frequencies versus the communication range characteristic of the radio frequency tag depicted in FIG. 33.

In addition, as illustrated in FIG. 33, the length of the third resonator 203 in the X-axis direction may be set to a value that is different from the length of other resonators 201 and 202. For example, radio frequency tags that can support both the UHF band and the 2.45 GHz band can be obtained by setting the length of the third resonator 203 in the X-axis direction (electrical length) to be shorter than (about the half of) the length (electrical length) of other resonators 201 and 202, as illustrated in the frequency versus communication range characteristic depicted in FIG. 34. That is, it becomes possible to adjust the operating frequency of the radio frequency tag by adjusting the length of the third resonator 203.

Figure 35:
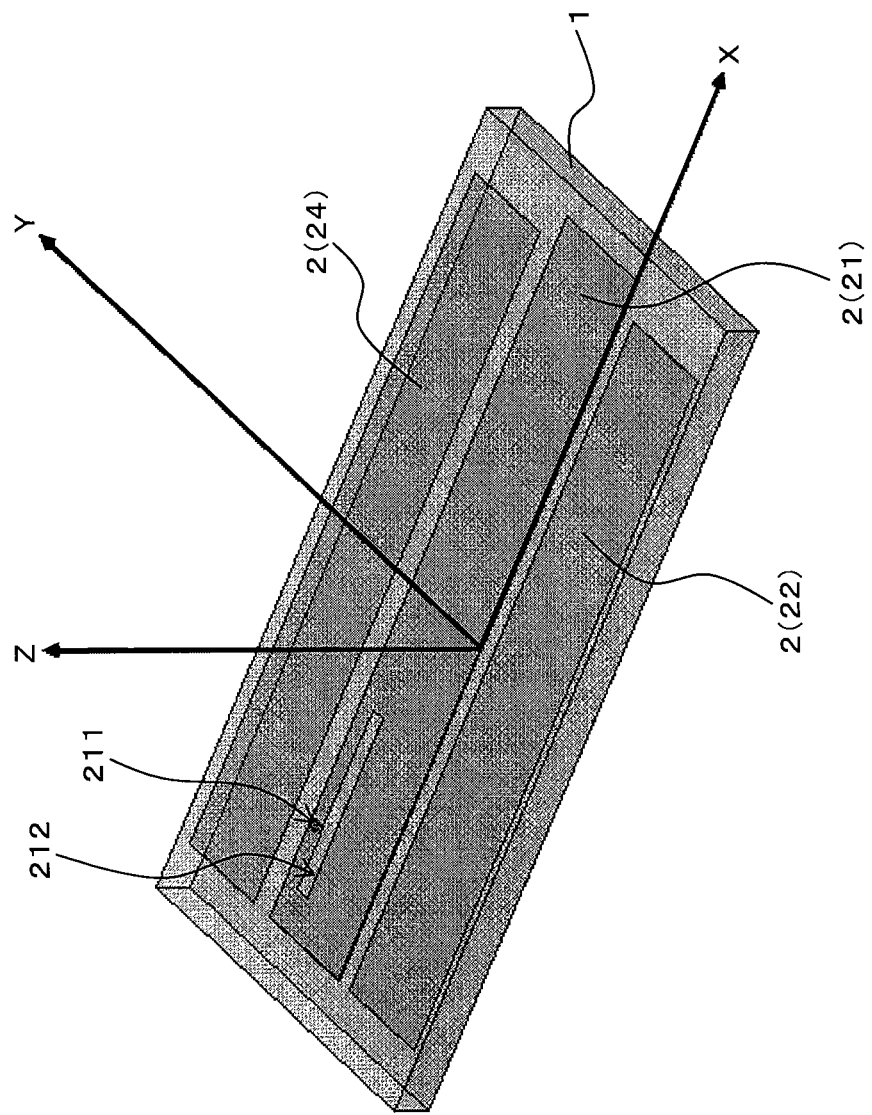
FIG. 35 is a schematic perspective view partially seeing through a radio frequency tag according to a variant of the radio frequency tag depicted in FIG. 1.
Figure 36:
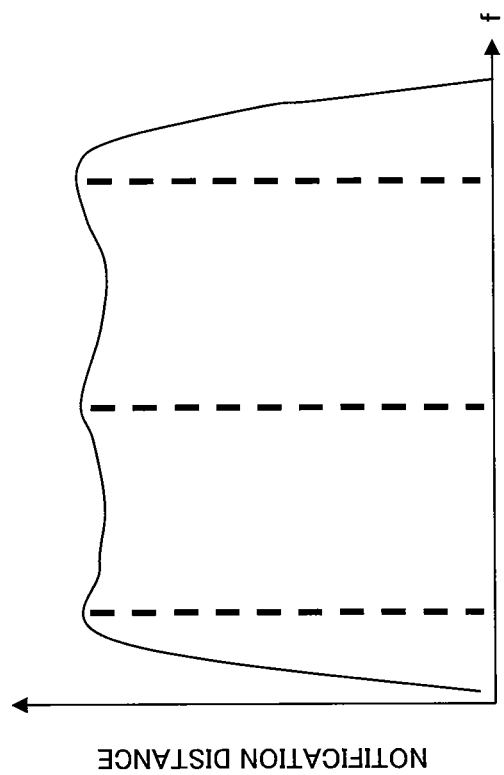
FIG. 36 is a diagram illustrating one example of frequencies versus the communication range characteristic of the radio frequency tag depicted in FIG. 35.
Figure 37:
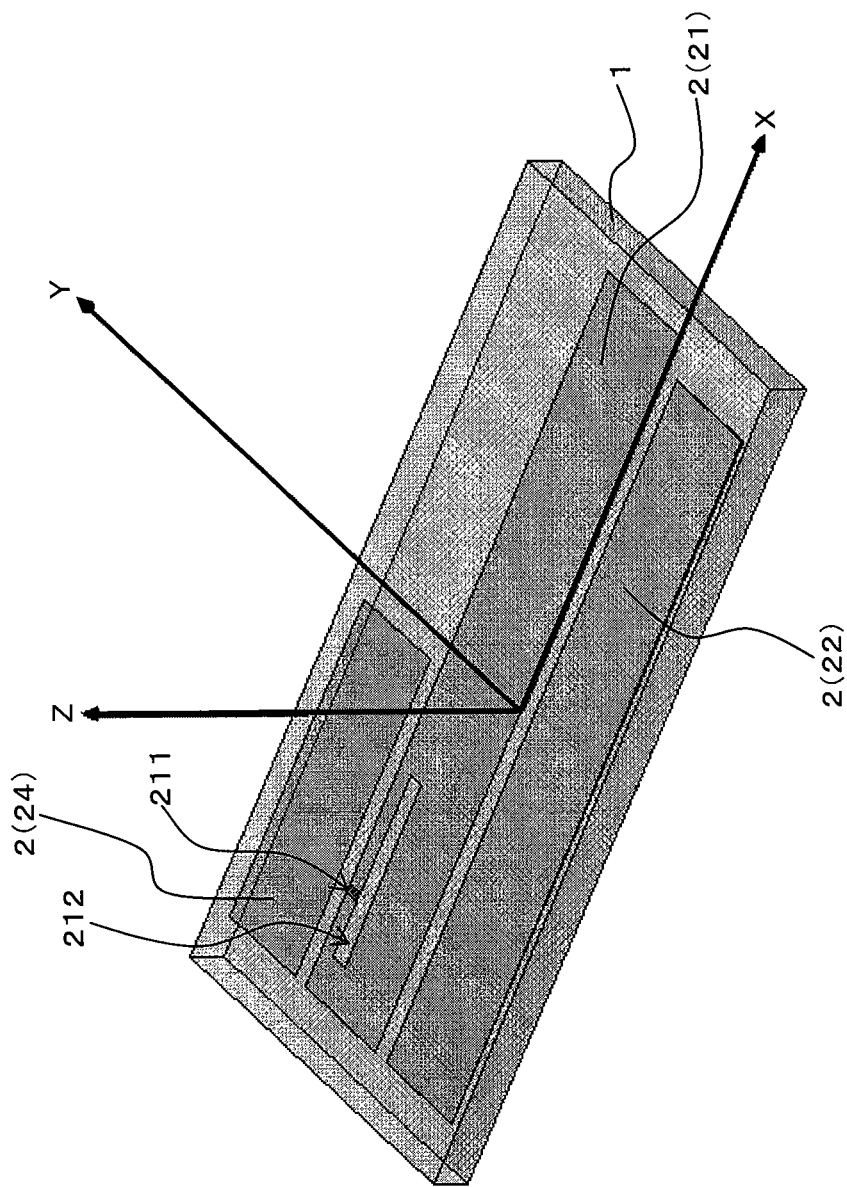
FIG. 37 is a schematic perspective view partially seeing through a radio frequency tag according to a variant of the radio frequency tag depicted in FIG. 1.
Figure 38:
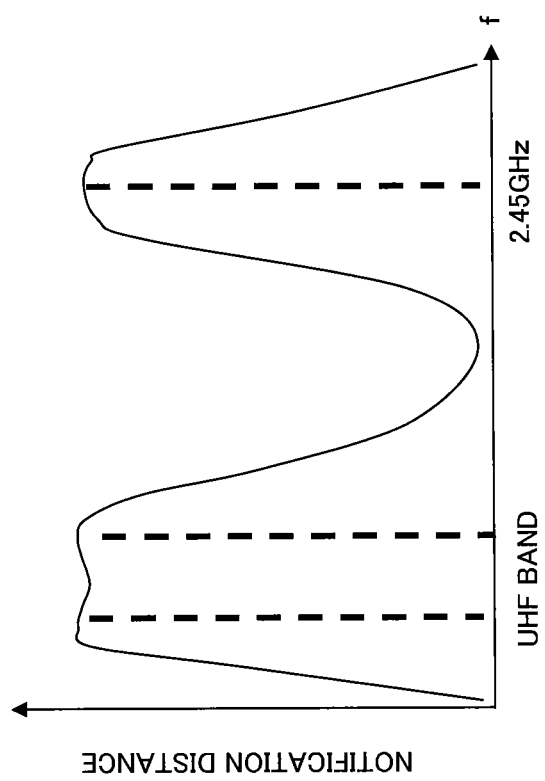
FIG. 38 is a diagram illustrating one example of frequencies versus the communication range characteristic of the radio frequency tag depicted in FIG. 37.
Figure 39:
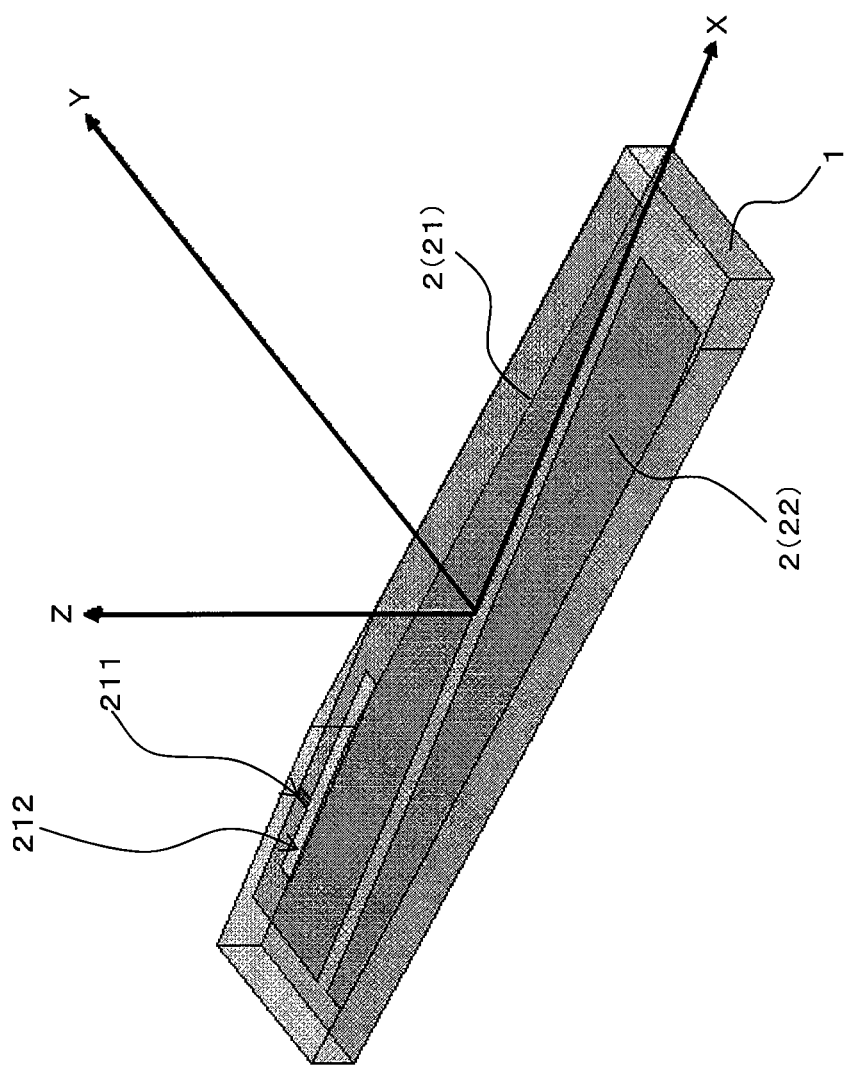
FIG. 39 is a schematic perspective view partially seeing through a radio frequency tag according to a variant of the radio frequency tag depicted in FIG. 1.
Figure 40:
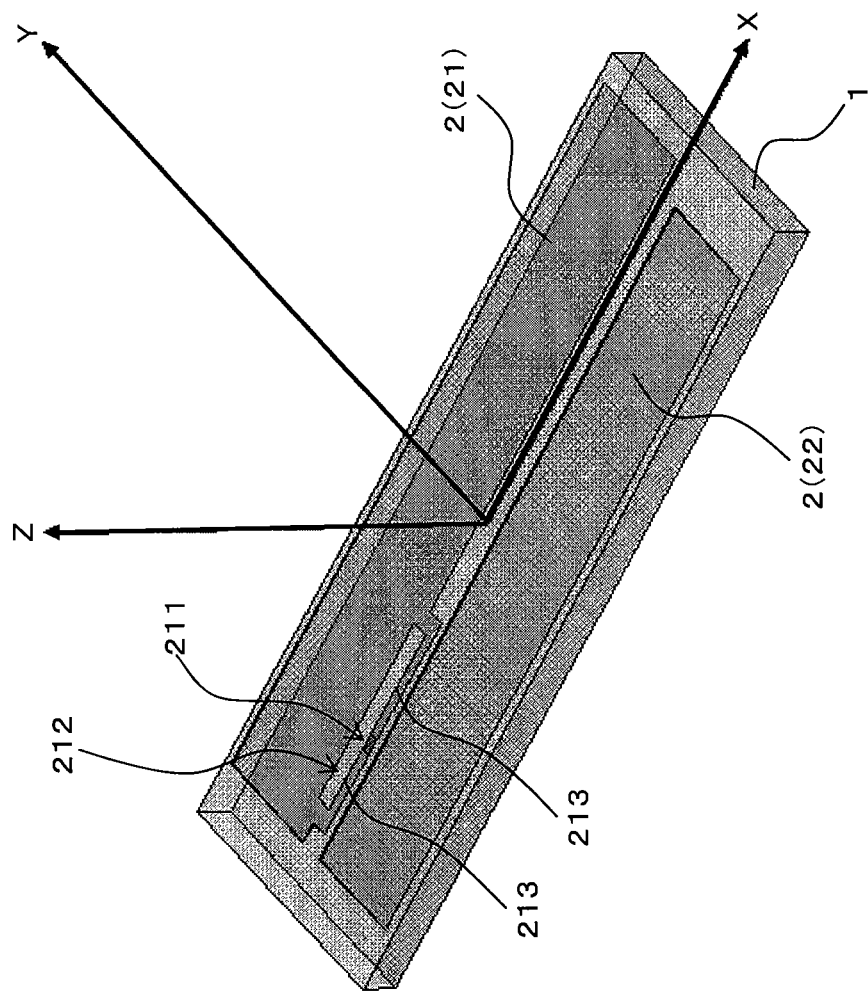
FIG. 40 is a schematic perspective view partially seeing through a radio frequency tag according to a variant of the radio frequency tag depicted in FIG. 1.
Figure 41:
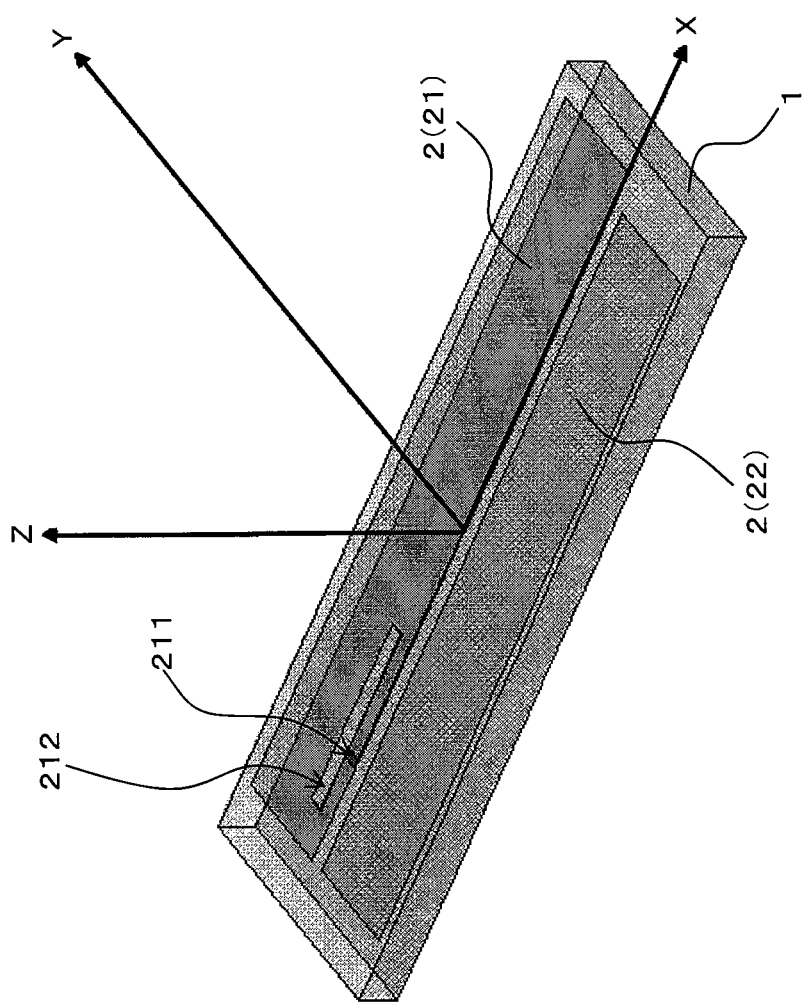
FIG. 41 is a schematic perspective view partially seeing through a radio frequency tag according to a variant of the radio frequency tag depicted in FIG. 1.

Note that the variants illustrated in FIG. 31 to FIG. 34 (adding the third resonator, adjusting the length of the third resonator in the X-axis direction) may be applied to the radio frequency tag of the first embodiment as illustrated in FIG. 35 to FIG. 38. In FIG. 35 and FIG. 37, however, reference numeral 24 denotes the third conductor (resonator) pattern, which forms the antenna pattern 2 together with the first and second conductor patterns 21 and 22. In addition, the variants illustrated in FIG. 28 to FIG. 30 may also be applied to the radio frequency tag of the first embodiment as illustrated in FIG. 39 to FIG. 41.

In addition, although the resonator pattern 300 are common to the resonator patterns 201 and 202 (or 201-203) in the above-described example, independent resonator patterns may be provided. In this case, it becomes possible to manufacture radio frequency tags more easily by forming two (or three) band-shaped conductor patterns having required lengths on the sheet-like member 20A, and wrapping the sheet-like member 20A around the three faces in the longitudinal direction of the dielectric block 100.

INDUSTRIAL APPLICABILITY

As described in detail above, since the radio frequency tag as set forth can provide a metal-resistant radio frequency tag that has a broad pass band (frequency versus communication range) characteristic than conventional ones, it is considered to be quite useful for the technical field of wireless communication or technical fields of production, inventory and distribution management of articles, POS systems, security systems, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A radio frequency tag comprising:
a first resonator pattern, the first resonator pattern comprising a chip connecting section to which a chip is to be connected, and an inductance section that is capable of adjusting an impedance matching with the chip; and
a second resonator pattern that is fed through electromagnetic induction coupling via the inductance section wherein,
the first and second resonator patterns are arranged in one of the faces of a dielectric substrate such that the inductance section performs as a power source to the second resonator pattern.

2. The radio frequency tag according to claim 1, wherein the first and second resonator patterns comprise a respective rectangular conductor pattern, and are arranged in parallel on the same plane.

3. The radio frequency tag according to claim 2, wherein the same plane is one of the faces of a dielectric substrate.

4. The radio frequency tag according to claim 3, further comprising a reflecting layer provided on the other face of the dielectric substrate.

5. The radio frequency tag according to claim 1, wherein the inductance section is formed by providing a slit in a part of the first resonator pattern.

6. The radio frequency tag according to claim 2, wherein the first and second resonator patterns have different electrical lengths in the direction in which the first and second resonator patterns are arranged in parallel with each other.

7. The radio frequency tag according to claim 6, wherein the length of the first resonator pattern in the direction in which the first resonator pattern is arranged in parallel with the second resonator pattern is longer than the length of the second resonator pattern.

8. The radio frequency tag according to claim 1, wherein the first and second resonator patterns are formed of an electrically conductive material on a sheet-like member that is applied on one side of a resin substrate that is a dielectric substrate.

9. The radio frequency tag according to claim 1, further comprising a resin material that covers the first and second resonator patterns.

10. The radio frequency tag according to claim 1, wherein the chip is connected to the chip connecting section.

11. The radio frequency tag according to claim 1, wherein the first and second resonator patterns are attached to a metal via a dielectric material.

12. The radio frequency tag according to claim 3, wherein a conductor pattern is provided in a portion including a region of the other face of the dielectric substrate, the region facing the first and second resonator patterns, and the conductor pattern and the first and second resonator patterns are electrically connected on a path via one side face of the dielectric substrate.

13. The radio frequency tag according to claim 12, wherein a side conductor that electrically connects between the conductor pattern and the first and second resonator patterns is provided on the one side face.

14. The radio frequency tag according to claim 13, wherein the side conductor is a metal plating or electrically conductive sheet-like member.

15. The radio frequency tag according to claim 13, wherein the side conductor is integrally formed with one or both of the conductor pattern, and the first and second resonator patterns.

16. The radio frequency tag according to claim 12, wherein the conductor pattern is a resonator pattern that is common to the first and second resonator patterns.

17. The radio frequency tag according to claim 16, further comprising a third resonator pattern that is fed through electromagnetic induction coupling via the inductance section,
wherein, on the face including the first and second resonator patterns, the second and third resonator patterns are provided such that the second and third resonator patterns are arranged symmetrically about the first resonator pattern.

18. The radio frequency tag according to claim 17, wherein the third resonator pattern has an electrical length that is shorter than the electrical lengths of the first and second resonator patterns.

19. The radio frequency tag according to claim 12, further comprising a resin material that entirely covers the first and second resonator patterns, and the conductor pattern.

20. A method of manufacturing a radio frequency tag, the method comprising:
forming a first resonator pattern and a second resonator pattern that is fed through electromagnetic induction coupling via an inductance section on a sheet-like member that can cover three faces of four faces defining the surrounding edge length in the longitudinal direction of a dielectric substrate in a region corresponding to one side and side faces of the dielectric substrate, the three faces are faces other than one of the side faces of the dielectric substrate opposing to the longitudinal direction, the first resonator pattern comprising a chip connecting section to which a chip is to be connected and the inductance section that is capable of adjusting an impedance matching with the chip;
forming a conductor pattern that electrically communicates with each of the resonator patterns in a region corresponding to the other face of the dielectric substrate of the sheet-like member; and
securing the sheet-like member to the dielectric substrate by wrapping the dielectric substrate with the sheet-like member such that the first and second resonator patterns are arranged on one side of the dielectric substrate whereas the conductor pattern is arranged on the other face of the dielectric substrate.

21. The method of manufacturing a radio frequency tag according to claim 20, wherein a guide member for aligning the sheet-like member upon the wrapping on the dielectric substrate is provided.

\* \* \* \* \*